(12) United States Patent
Simmons

(10) Patent No.: US 9,535,226 B2
(45) Date of Patent: Jan. 3, 2017

(54) MODULAR BREAKOUT DEVICE FOR OPTICAL AND ELECTRICAL CONNECTIONS

(71) Applicant: 3M INNOVATIVE PROPERTIES COMPANY, St. Paul, MN (US)

(72) Inventor: Richard L. Simmons, Leander, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/768,875

(22) PCT Filed: Feb. 7, 2014

(86) PCT No.: PCT/US2014/015317
§ 371 (c)(1),
(2) Date: Aug. 19, 2015

(87) PCT Pub. No.: WO2014/158369
PCT Pub. Date: Oct. 2, 2014

(65) Prior Publication Data
US 2015/0378122 A1    Dec. 31, 2015

Related U.S. Application Data

(60) Provisional application No. 61/806,454, filed on Mar. 29, 2013, provisional application No. 61/815,055, (Continued)

(51) Int. Cl.
*G02B 6/44* (2006.01)
*H01R 27/02* (2006.01)
(Continued)

(52) U.S. Cl.
CPC .......... *G02B 6/4448* (2013.01); *G02B 6/4453* (2013.01); *G02B 6/4471* (2013.01); *G02B 6/4478* (2013.01);
(Continued)

(58) Field of Classification Search
USPC 439/529, 535, 658, 651, 501, 214; 385/135, 78
See application file for complete search history.

(56) References Cited

U.S. PATENT DOCUMENTS 4,885,747 A * 12/1989 Foglia .................... H04N 7/108
348/E7.051
6,607,408 B2 * 8/2003 Milan ................. G06F 13/4095
361/732

(Continued)

FOREIGN PATENT DOCUMENTS

| EP | 2527897 | 11/2012 |
|---|---|---|
| WO | WO 93-08650 | 4/1993 |
| WO | WO 2010-083150 | 7/2010 |

OTHER PUBLICATIONS

International Search Report for PCT International Application No. PCT/US 2014/015317 mailed on Jun. 19, 2014, 2 pages.

*Primary Examiner* — Alexander Gilman
(74) *Attorney, Agent, or Firm* — Janet A. Kling

(57) ABSTRACT

The present invention relates to a modular breakout device providing optical and/or electrical connection interfaces in each modular unit. The exemplary breakout device includes a housing made up of a plurality of individual compartments stacked upon each other and a cover that is attachable to the housing. The plurality of individual compartments includes a base compartment configured with a port though a wall of the base compartment that is configured to accept optical and/or electrical transmission media and a first furcation tray. The first furcation tray is disposed on top of the base (Continued)

compartment and the cover is disposed on top of the first furcation tray to enclose the housing. In one exemplary aspect, the breakout device has an optical connection interface and an electrical connection interface disposed in a side wall of the first furcation tray.

20 Claims, 35 Drawing Sheets

Related U.S. Application Data filed on Apr. 23, 2013, provisional application No. 61/871,465, filed on Aug. 29, 2013.

(51) Int. Cl.
    *H01R 13/648*     (2006.01)
    *H01R 25/00*     (2006.01)
    *H01R 35/02*     (2006.01)

(52) U.S. Cl.
    CPC .......... *H01R 13/648* (2013.01); *H01R 25/006* (2013.01); *H01R 27/02* (2013.01); *H01R 35/02* (2013.01)

(56) References Cited

U.S. PATENT DOCUMENTS

| | | | |
|---|---|---|---|
| 6,755,676 B2* | 6/2004 | Milan | H01R 25/003 439/214 |
| 6,830,477 B2* | 12/2004 | Vander Vorste | H01R 13/743 439/214 |
| 7,120,347 B2 | 10/2006 | Blackwell, Jr. et al. | |
| 7,123,808 B2* | 10/2006 | Denovich | G02B 6/4452 385/134 |
| 7,167,624 B2* | 1/2007 | Allerellie | G02B 6/4453 385/135 |
| 7,171,121 B1* | 1/2007 | Skarica | H04L 45/22 398/67 |
| 7,333,708 B2 | 2/2008 | Blackwell, Jr. et al. | |
| 7,356,237 B2 | 4/2008 | Mullaney et al. | |
| 7,469,091 B2 | 12/2008 | Mullaney et al. | |
| 7,653,282 B2 | 1/2010 | Blackwell, Jr. et al. | |
| 7,740,409 B2 | 6/2010 | Bolton et al. | |
| 7,753,596 B2 | 7/2010 | Cox | |
| 7,845,974 B2* | 12/2010 | Yue | H01R 13/72 191/12.4 |
| 8,165,443 B2 | 4/2012 | Zhou et al. | |
| 8,180,191 B2 | 5/2012 | Blackwell, Jr. et al. | |
| 8,221,131 B1* | 7/2012 | Mazyck | H01R 25/003 439/13 |
| 8,270,797 B2 | 9/2012 | Zhou et al. | |
| 8,585,444 B2* | 11/2013 | Chang | H01R 13/627 439/131 |
| 8,660,397 B2* | 2/2014 | Giraud | G02B 6/4441 385/135 |
| 8,693,207 B2* | 4/2014 | Yang | H01R 27/00 361/752 |
| 8,705,926 B2* | 4/2014 | Giraud | G02B 6/4452 385/135 |
| 8,718,434 B2* | 5/2014 | Gronvall | G02B 6/4471 385/135 |
| 8,894,436 B2* | 11/2014 | Su | H01R 12/7088 439/501 |
| 8,929,708 B2* | 1/2015 | Pimentel | G02B 6/4441 385/135 |
| 9,116,324 B2* | 8/2015 | Cooke | G02B 6/4452 |
| 2003/0174996 A1* | 9/2003 | Henschel | G02B 6/2804 385/135 |
| 2006/0165366 A1* | 7/2006 | Feustel | G02B 6/2804 385/135 |
| 2006/0269206 A1* | 11/2006 | Zimmel | G02B 6/3825 385/135 |
| 2009/0065237 A1* | 3/2009 | Evoniuk | H02G 15/24 174/22 R |
| 2009/0238531 A1* | 9/2009 | Holmberg | G02B 6/445 385/135 |
| 2010/0189404 A1* | 7/2010 | Rudenick | G02B 6/4455 385/135 |
| 2011/0052133 A1* | 3/2011 | Simmons | G02B 6/4455 385/135 |
| 2011/0280537 A1* | 11/2011 | Cowen | G02B 6/4471 385/135 |
| 2012/0106913 A1 | 5/2012 | Makrides-Saravanos et al. | |
| 2012/0295486 A1* | 11/2012 | Petersen | G06F 1/00 439/658 |
| 2013/0022318 A1* | 1/2013 | Fingler | G02B 6/4292 385/78 |
| 2013/0294738 A1* | 11/2013 | Simmons | G02B 6/4439 385/135 |
| 2015/0378122 A1* | 12/2015 | Simmons | H01R 27/02 439/529 |

\* cited by examiner

MODULAR BREAKOUT DEVICE FOR OPTICAL AND ELECTRICAL CONNECTIONS

FIELD OF THE INVENTION

The present invention relates to a modular breakout device. In particular, the breakout device described herein includes an optical and/or an electrical connection interface in each modular unit.

BACKGROUND OF THE INVENTION

Telecommunication cables are ubiquitous and used for distributing data across vast networks. The majority of cables are electrically conductive cables (typically copper), although the use of optical fiber cables is growing rapidly in telecommunication networks as larger and larger amounts of data are transmitted. As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on.

In some installations, hybrid cables or composite cables containing both optical and electrical conductors may be used, or the telecommunication cables can be disposed in protective conduits to provide protection to the cables contained therein. When a protective conduit or hybrid cable is used, environmental protection is needed at the breakout point where the cables within the conduit of hybrid cable are accessed so that the signals being carried by the cables can be routed to the desired location or piece of equipment. Conventional methods of making this final connection include taking the individual cables from the conduit or hybrid cable and running them directly to the remote location or equipment, or to connect the terminal ends of the cables in a the conduit or hybrid cable to individual jumper cables within a conventional telecommunication enclosure. Both of these approaches have disadvantages. For example, when cables from a hybrid cable having sufficient conductors to service multiple remote sites are used, the jacket and shielding layer (if present) of the cable must be removed for a sufficient length to allow the routing of the cable to the most distant of the locations being served by the cables. Doing the connection in this manner could be wasteful of the expensive hybrid cable that is being deconstructed to serve the remote sites. In addition, this approach would require an additional labor expense to express excessive lengths of the interior cables disposed within the hybrid cable.

Thus, the lower cost of using separate optical and electrical conductors might lead on to use the conventional closure approach mentioned above. However, this approach can require complex splicing/connection operations to be done in the field which may be undesirable if the craftsman doing the installation does not have the proper degree of skill or if the installation is done in a challenging environment such as when the connections are being made a hundred or so feet in the air on a cell tower installation.

Thus, a breakout/terminal device for multimedia multi-conductor cables and conduits is needed that allows simple and reliable connection of electrical and optical conductors in the field.

SUMMARY OF THE INVENTION

The present invention relates to a modular breakout device providing optical and/or electrical connection interfaces in each modular unit. The exemplary breakout device includes a housing made up of a plurality of individual compartments stacked upon each other and a cover that is attachable to the housing. The plurality of individual compartments includes a base compartment configured with a port though a wall of the base compartment that is configured to accept optical and/or electrical transmission media and a first furcation tray. The first furcation tray is disposed on top of the base compartment and the cover is disposed on top of the first furcation tray to enclose the housing.

In one exemplary aspect, the breakout device has an optical connection interface and an electrical connection interface disposed in a side wall of the first furcation tray. In another exemplary aspect, the breakout device can include two optical connection interfaces in a side wall of the first furcation tray. In yet another exemplary aspect, the breakout device can include two electrical connection interfaces in a side wall of the first furcation tray.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
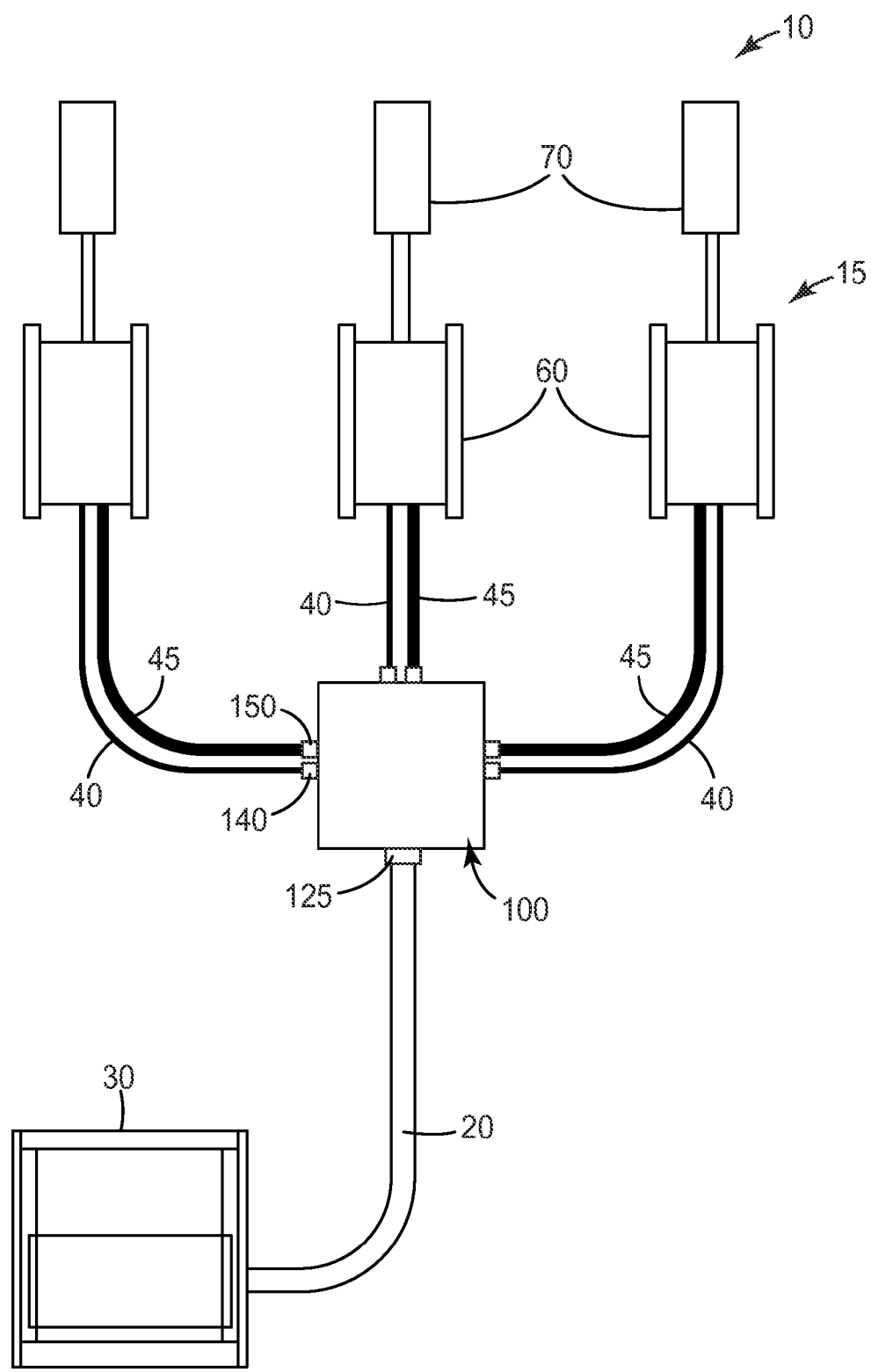
FIG. 1 shows a schematic diagram of cell tower configuration that can utilize an exemplary breakout device according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Evolving requirements for increased data capability to support "smartphones" are driving the implementation of distributed radio systems with power amplifiers and radios mounted on the tower. This architecture is more power-efficient and permits more RF connections from the remote radio unit (RRU) to the antenna. This, in turn, enables advanced antennas such as Multiple In-Multiple Out (MIMO) antennas to be utilized to gain the requisite signal-to-noise ratio required to support very high bandwidth LTE/4G mobile services. In most cases, the RRU is fiber-fed with digital communication protocols. In addition, placing the RRUs on the towers requires that a power (electrical) line be provided to each RRU.

In fourth generation (4G) wireless communication systems, the remote radio units are being deployed up on the tower near the antennas. These remote radio units are connected to the network with a pair of optical fibers and are powered with a pair of copper wires (typically AWG #6 to #12). Because each cell tower can accommodate a plurality of remote radio units, it is desirable to use higher conductor count cables or conduits that can carry a plurality of conductors from the base station on the ground to the equipment levels or tiers disposed a hundred or more feet up the tower. To answer this need, cable manufacturers are making jacketed hybrid cable constructions that contain both the fiber optic and power conductors needed for these remote radio unit deployments. Alternatively, some telecommunication companies are using conduits containing a plurality of optical fiber cables and electrical conductors for the vertical trunk cable to serve the remote radio units on the tower.

Regardless of the type of trunk cable used up the tower, the point where the individual cables leave the trunk cable needs to be environmentally protected. The exemplary breakout device described herein can provide the needed degree of environmental protection while simultaneously providing a simple and reliable connection interface for both electrical and optical conductors with conventional ruggedized jumpers. In particular, the exemplary breakout device provides for a pre-terminated hybrid cable assembly that is prepared prior to installation on the cell tower. This pre-terminated hybrid cable assembly can be factory assembled or can be assembled in the field at the cell site prior to installation on the tower. Thus, the exemplary pre-terminated hybrid cable assembly can be mounted to the tower allowing the jumper cables to be connected to the appropriate connection interface.

FIG. 1 is a schematic representation of a conventional cell tower 10 having one tier 15 having three remote radio units 60 and three antennas 70. The equipment and antennas on each tier may belong to a separate telecommunication service provider. Each of the antennas in a given tier provides cell signal reception for about a 120° sector around the cell tower. Cell towers can include additional antenna tiers as well as additional antennas per tier as required for a particular network configuration. For example, each tier on a cell tower can have four antennas, each antenna providing cell signal reception for a 90° sector or six antennas, each antenna providing cell signal reception for a 60° sector. Increasing the number of antennas in a given tier can increase the signal carrying capacity of the tower.

For the cell tower installation is shown schematically in FIG. 1, a distribution or trunk cable 20 (e.g. a hybrid cable comprising a plurality of optical fibers and at least two electrical conductors or a conduit containing a plurality of optical fibers and at least two electrical conductor) for carrying communication signals and power can be routed from a base station, site support cabinet or cell tower terminal enclosure 30 on or near ground level up the tower to a breakout point or device 100 near the remote radio units 60 and corresponding antennas 70 which can be located over a hundred feet in the air.

Optical fiber jumper 40 and electrical jumper 45 interconnect the breakout device to the remote radio units 60. An exemplary breakout device 100 can include at least one primary cable port 125 to accept trunk cable 20 and a one or more optical connection interfaces 140 and one or more electrical connection interfaces 150 disposed at an outside wall of the breakout device to allow direct connection of the optical and electrical jumpers.

Figure 2:
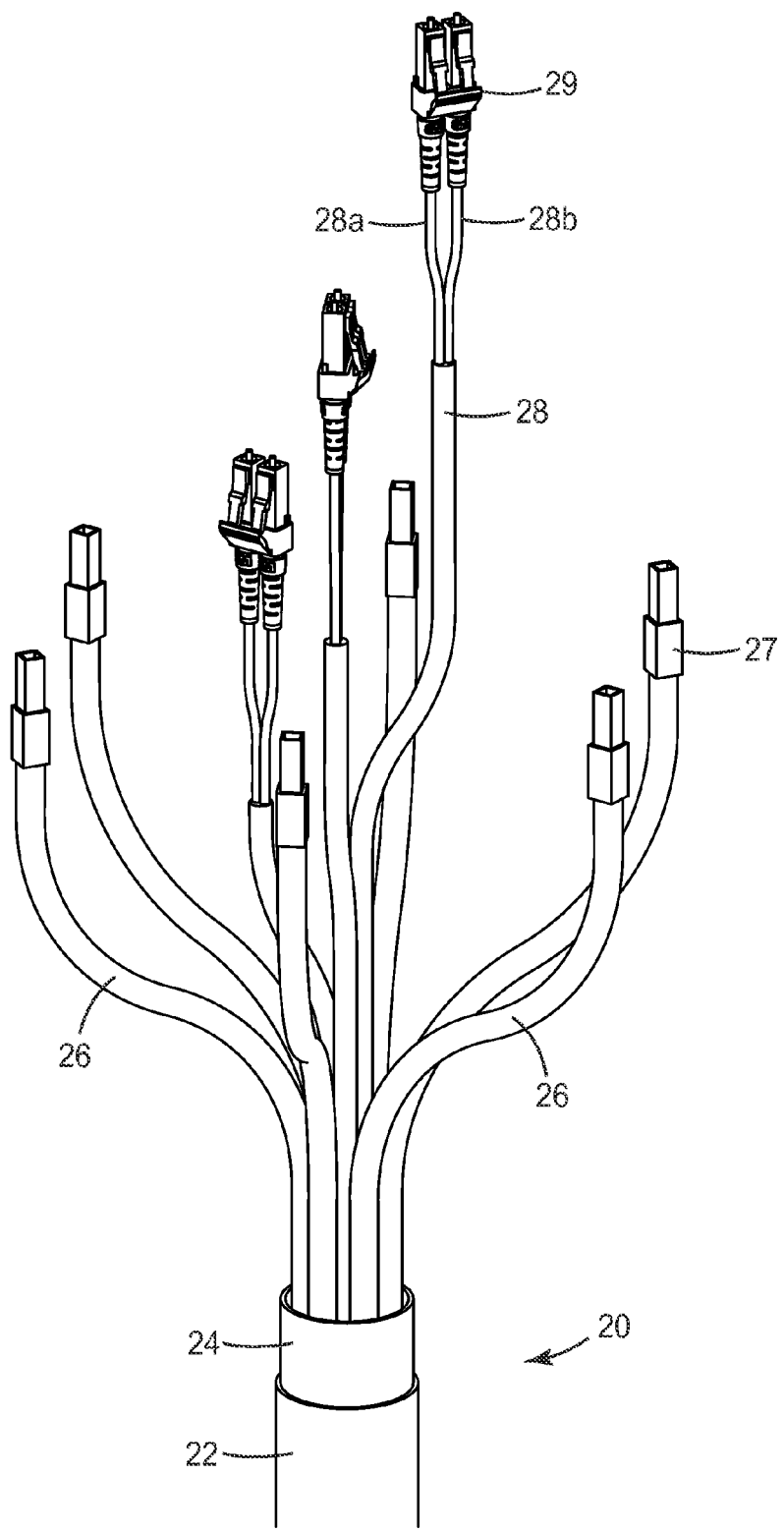
FIG. 2 is an isometric view showing an exemplary hybrid cable construction.

FIG. 2 shows an exemplary hybrid or composite cable construction that can be used as the trunk cable 20 in cell tower applications. Trunk cable 20 includes six electrical conductors 26 and three dual fiber optical conductors or cables 28 contained within a cable sheath 22. Some hybrid trunk cables can also include a shielding layer, such as shielding layer 24 (shown in FIG. 2) surrounding the optical and electrical conductors 28, 26, respectively, within the hybrid trunk cable 20 and beneath the cable sheath 22.

Each electrical conductor can be a single stranded wire, a multi-stranded wire, or a coaxial cable that is surrounded by an insulating coating. Each of the dual fiber optical conductors 28 can include two individual optical fiber cables 28a, 28b contained within a cable jacket. Each of the optical fiber cables can include the centralized glass core/clad structure that is surrounded by a first buffer coating layer that can then be surrounded by a jacket layer. The optical fiber cables can additionally include strength members disposed between the at least first buffer coating layer and a jacket layer. Additional strength members can be disposed within the dual fiber optical conductors that extend parallel with the optical fiber cables. The optical fiber cables can contain either single mode or multimode optical fibers. In an alternative aspect, the hybrid cable can contain individual optical fiber cables or a multi-fiber cable having a sufficient number of optical fibers to accommodate the equipment on one tier of the cell tower.

In an exemplary aspect, the conductors in trunk cable 20 can be pre-terminated with an appropriate electrical or optical fiber connector(s). The electrical connectors can be socket style contacts 27 (shown in FIG. 2) such as 0.125 POWERBAND Socket Contacts available from Tyco Electronics Corporation, (Berwyn, Pa.) or pin style contacts (not shown) such as 0.125 POWERBAND Pin Contacts available from Tyco Electronics Corporation, (Berwyn, Pa.). The optical fiber connectors can be LC format connectors 29 shown duplexed in FIG. 2. Alternatively, the optical fiber connectors can be SC, FC, or ST format connectors or can be a conventional dual fiber connector.

Figure 3:
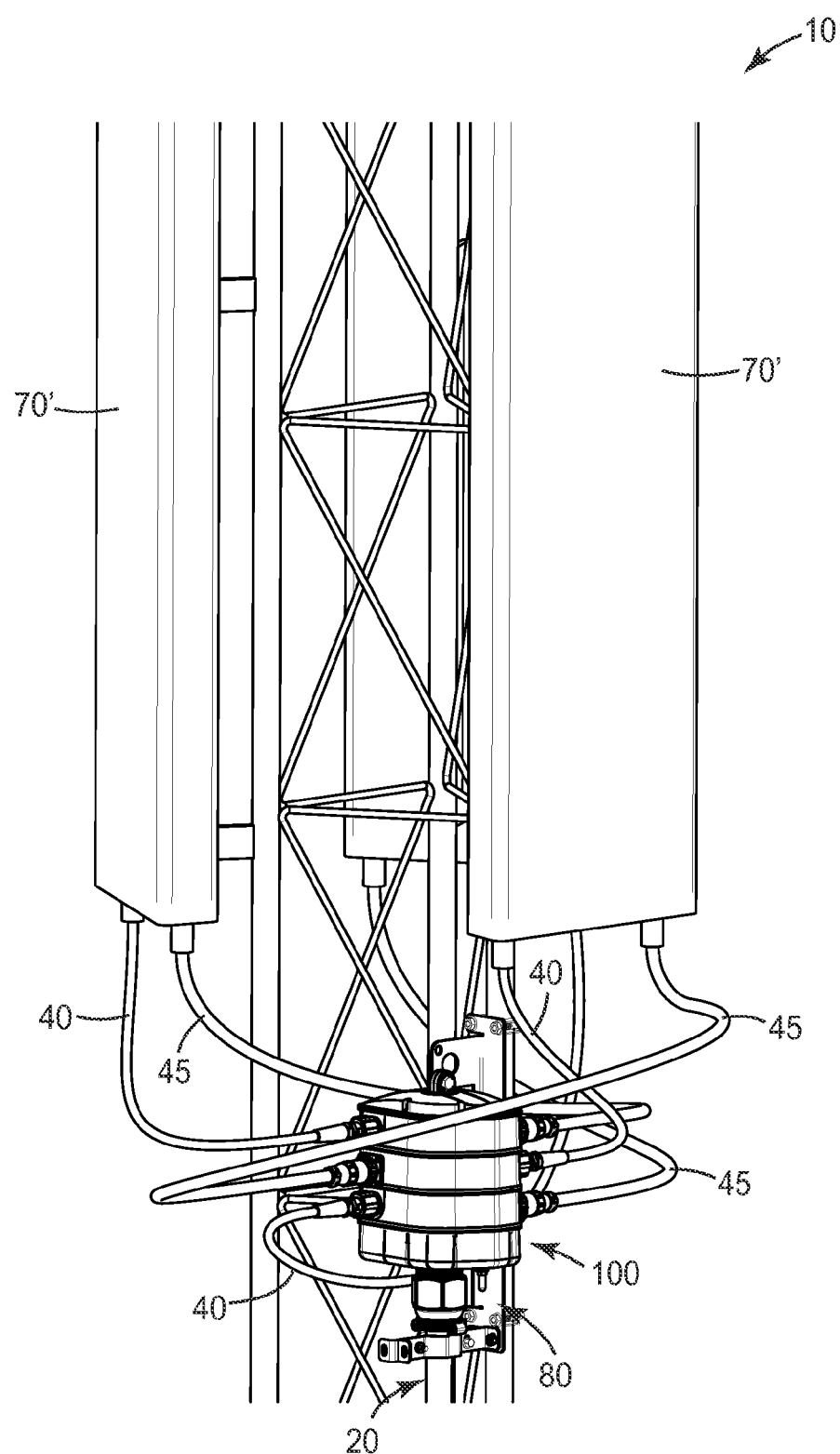
FIG. 3 is an isometric view showing a portion of a cell tower representation with an exemplary breakout device according to an aspect of the invention.

FIG. 3 shows an alternative representation of a portion of cell tower 10 showing breakout devices 100 attached to the tower by a mounting bracket 80. The breakout device can be located near antennas 70' having on-board remote radio units. Breakout device 100 can be configured as a simple branch point for hybrid cables or conduits and provides an optical connection interface for optical jumpers 40 that carry optical communication signals to the remote radio units as well as electrical connection interface for DC power line connections for electrical jumpers 45 which carry power for the remote radio units. The exemplary breakout device 100 can be configured to provide interconnections for a single remote radio unit or for a plurality of remote radio units on a single tier of the tower.

FIGS. 4A-4D show four views of an exemplary breakout device 100 in accordance with the present invention. Break out device 100 has a housing made up of a plurality of individual compartments 120, 130 stacked one upon another and a cover 110 that is attachable to the housing. The plurality of individual compartments includes a base compartment 120 and at least one furcation tray 130 configured to provide a plug-and-play connection to remote radio unit(s) served by the break out device by jumper cables having ruggedized connectors 42, 46. In the exemplary break out device shown in FIGS. 4A-4D, break out device 100 is configured to serve three remote radio units, each remote radio unit having a dedicated furcation tray 130. Thus, break out device 100 is show as having four individual compartments (one base unit and three furcation trays). The modular design of breakout device 100 enables capacity customization (i.e. the ability to service additional remote radio units) by simply adding additional furcation trays to the housing. Any additional trays can be added to the stacked housing between the base compartment 120 and the cover 110.

Figure 5A:
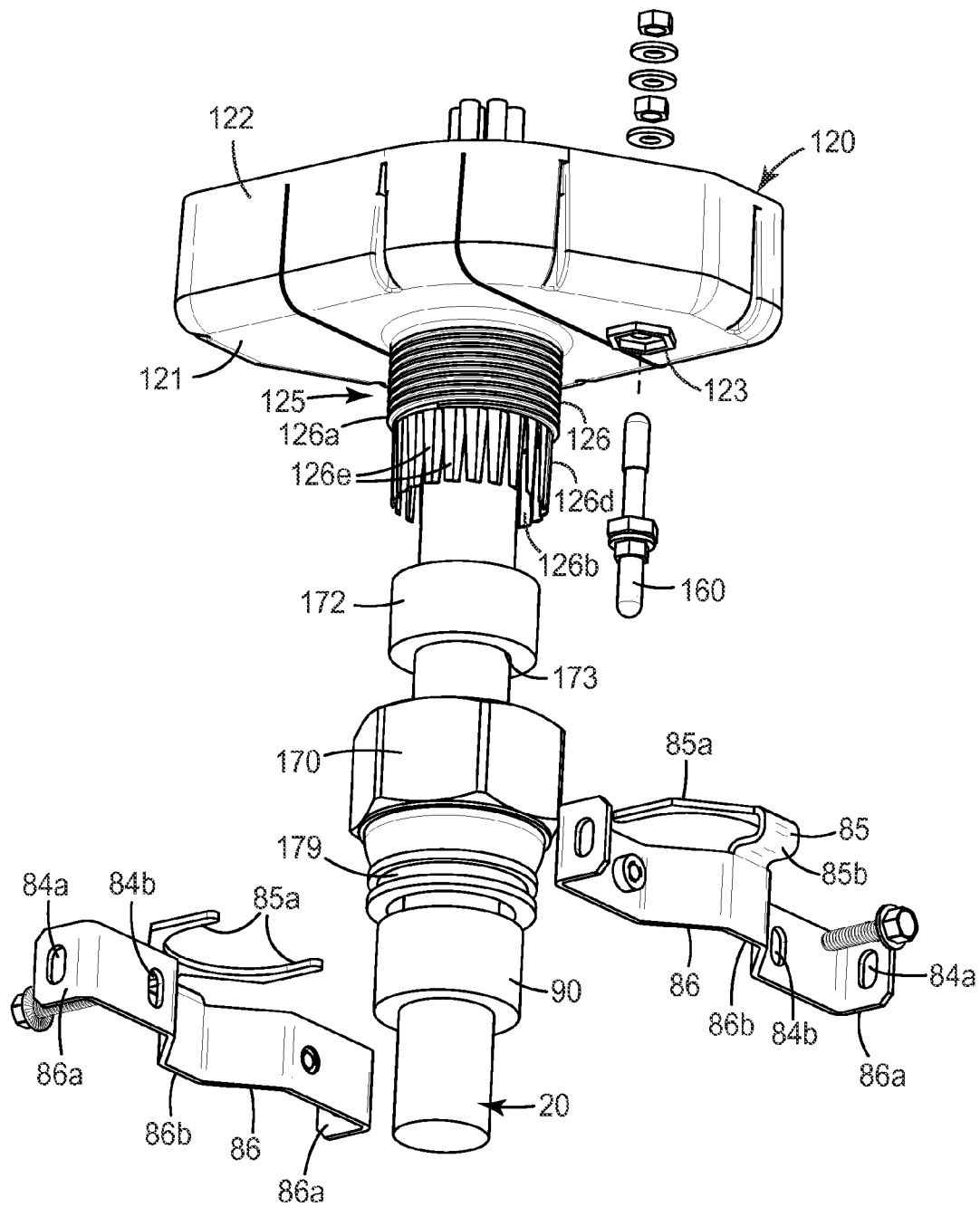
FIGS. 5A and 5B are two views of a base compartment of the exemplary breakout device according to an aspect of the invention.
Figure 5B:
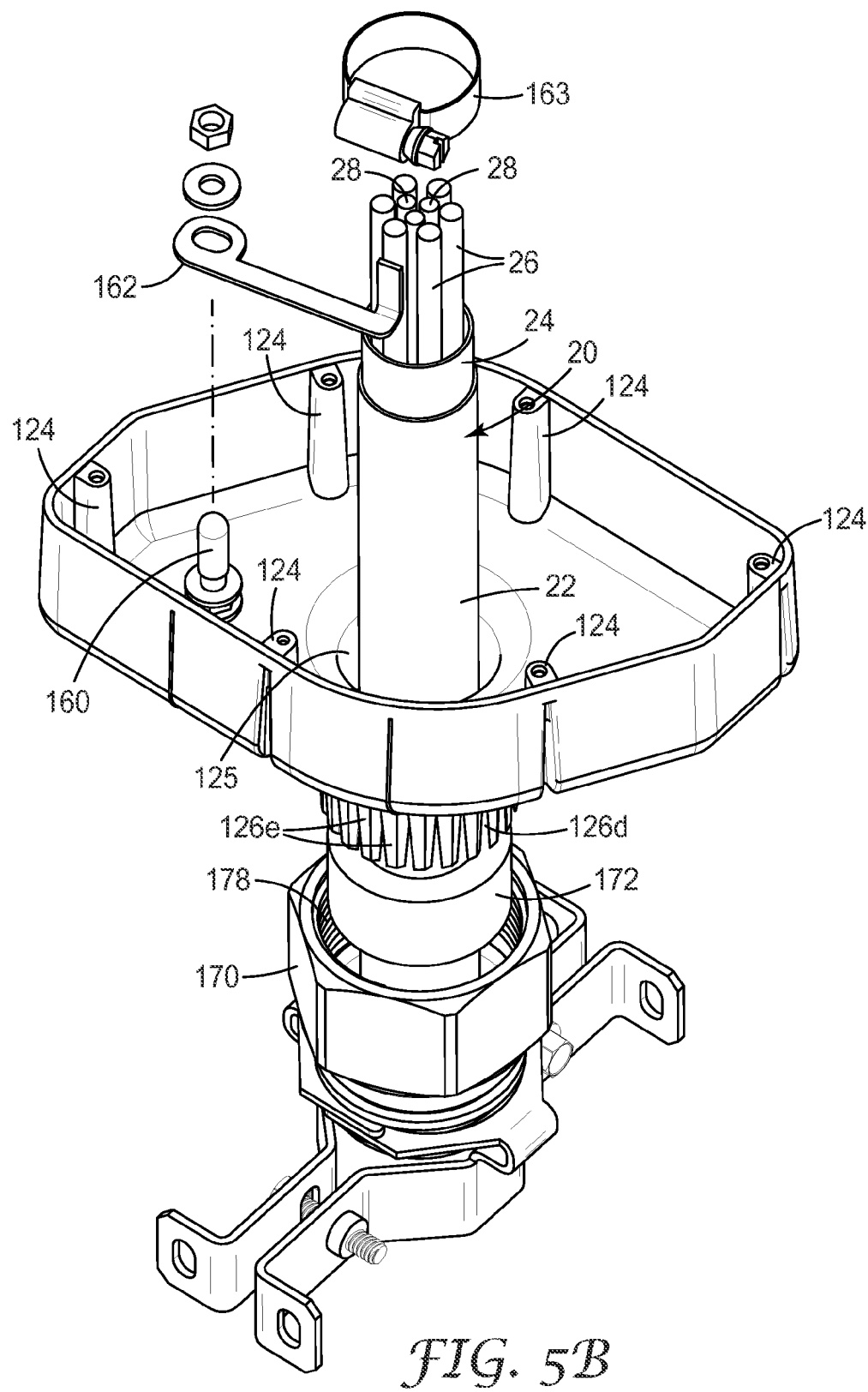

Base compartment 120 is shown in additional detail in FIGS. 5A and 5B. Base compartment 120 includes a bottom wall 121, a plurality of side walls 122 extending from the bottom wall and a cable port 125 extending though the bottom wall 121 of the base compartment to accept trunk cable 20. The base compartment can have a generally trapezoidal or convex quadrilateral shape as is shown in FIG. 5B. Alternatively, the base compartment can have another shape, such as a rectangular, square, triangular, elliptical, circular or other polygonal shape as dictated by design choice.

Cable port 125 can have an external sheath 126 extending from the bottom wall 121 outside of the base compartment 120. The external sheath includes a passageway 126b extending longitudinally through the external sheath, a compressible portion 126d along its free edge, an external threaded portion 126a located between the bottom wall 121 of the base compartment and the compressible portion. The external threaded portion 126a cooperates with a corresponding internal threaded portion 178 of a clamping nut 170 to cause a compressible portion 126d of the cable port to conform to an outer surface of the trunk cable or the outer surface of an optional internal sealing member 172 fitted into the passageway through the compressible portion and around the trunk cable.

The compressible portion 126d may be reduced in size (diameter) when an external radial force is exerted on it such as by application of a clamping nut 170. The compressible portion 126d can center the trunk cable and/or it can exert a compression force on an internal sealing member, if used, when the inlet device 100 is installed on the trunk cable. The compressible portion 126d may include a plurality of spaced apart flexible fingers 126e which surround passageway through the compressible portion. The fingers 126e may be squeezed together when clamping nut 170 is attached to the second end of the housing.

Sealing member 172 can be fitted at least partially into the passageway though the cable port to improve the sealing capability around the trunk cable. The sealing member includes a bore 173 extending therethrough to accommodate trunk cable 20. In one exemplary aspect, the sealing member can have a slit extending from the outside surface of the sealing member into the bore to allow installation of the trunk cable without having to thread it through the bore.

Exemplary sealing member 172 may be formed from, for example, elastomeric and polymeric materials, such as thermoplastic elastomers, vulcanite rubbers, polyurethane foams, reactive and non-reactive polymers, and soft plastics, to name a few. Material selection will depend upon factors including, but not limited to, material durometer, chemical and environmental exposure conditions including temperature and humidity conditions, and flame-retardancy requirements, to name a few.

Base compartment 120 can further include an opening 123 extending through the bottom wall 121 to accept a ground stud 160. As mentioned previously, some hybrid trunk cables 20 can include a shielding layer 24 surrounding the optical and electrical conductors 28, 26, respectively, within the hybrid trunk cable 20 and beneath the cable sheath 22. The shielding layer of the trunk cable can be connected to the ground stud by bridging element 162 and a worm-drive clamp 163 inside the interior of the base compartment. A ground wire (not shown) can connect the ground stud to the cell tower superstructure outside of breakout device 100 so that the trunk cable's shielding layer is connected to earth ground.

Figure 6A:
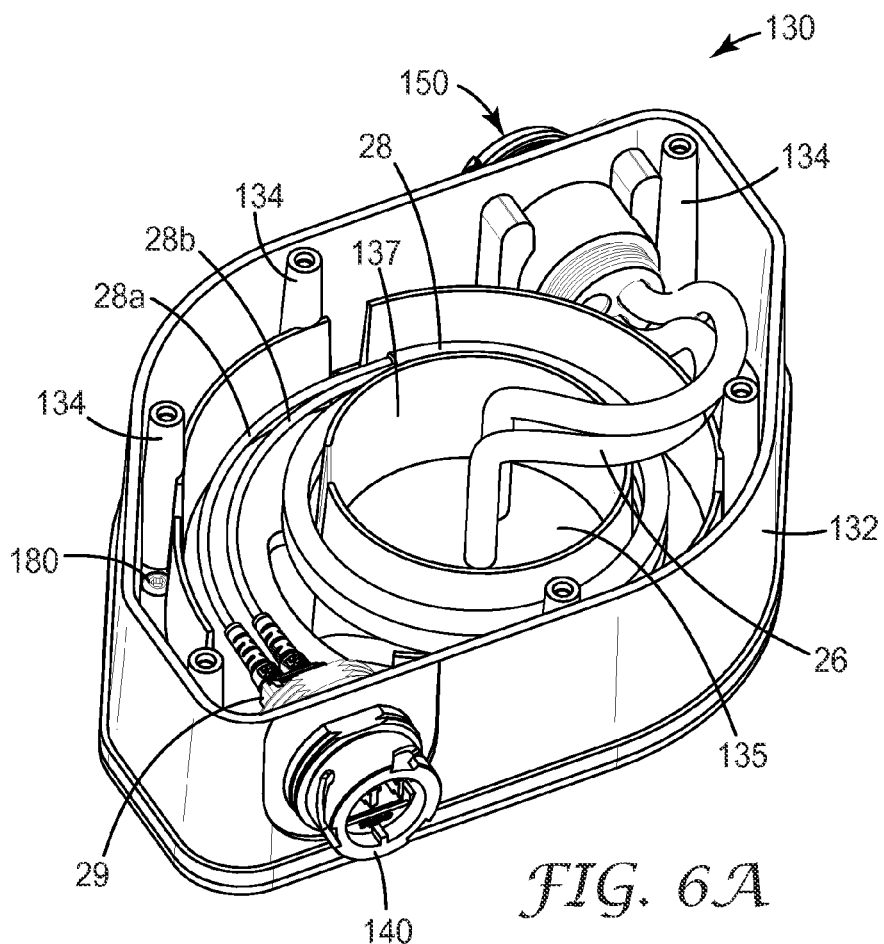
FIGS. 6A-6D are four views of a furcation tray of the exemplary breakout device according to an aspect of the invention.
Figure 6B:
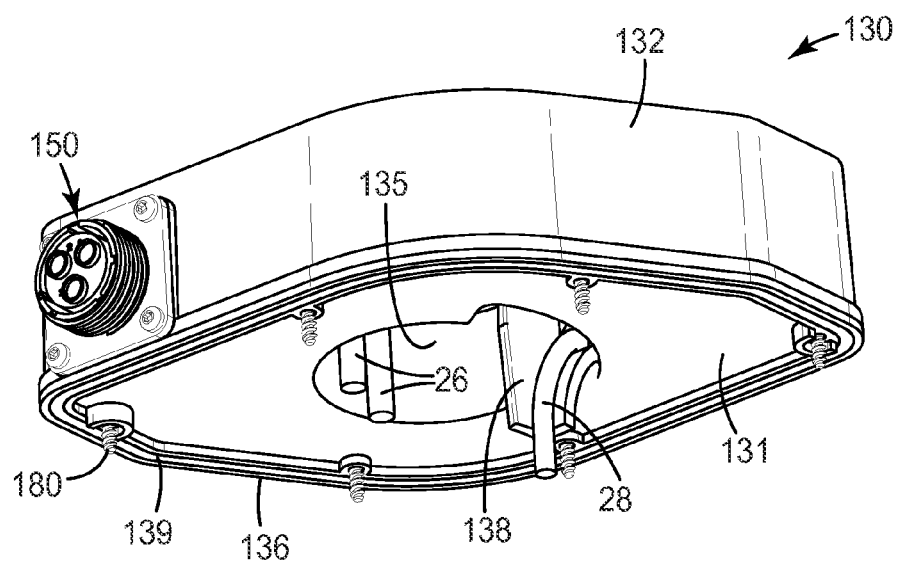
Figure 6C:
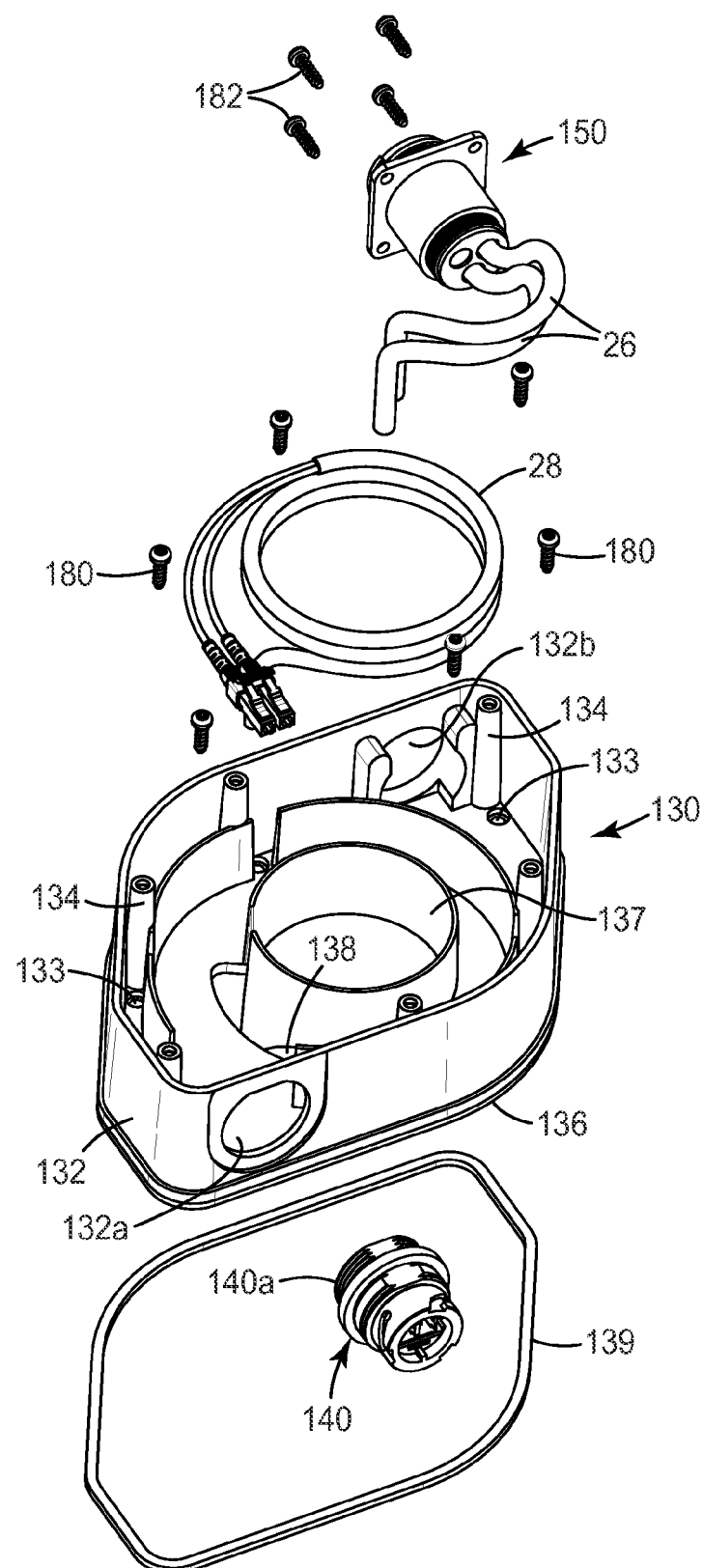

Finally, base compartment 120 includes a plurality of receiving bosses 124 dispersed around the circumference of the base compartment to allow attachment of the first of the at least one furcation trays to the base compartment by mechanical fasteners such as screws or bolts, such as mechanical fasteners 180 shown in FIGS. 6B and 6C.

Figure 6D:
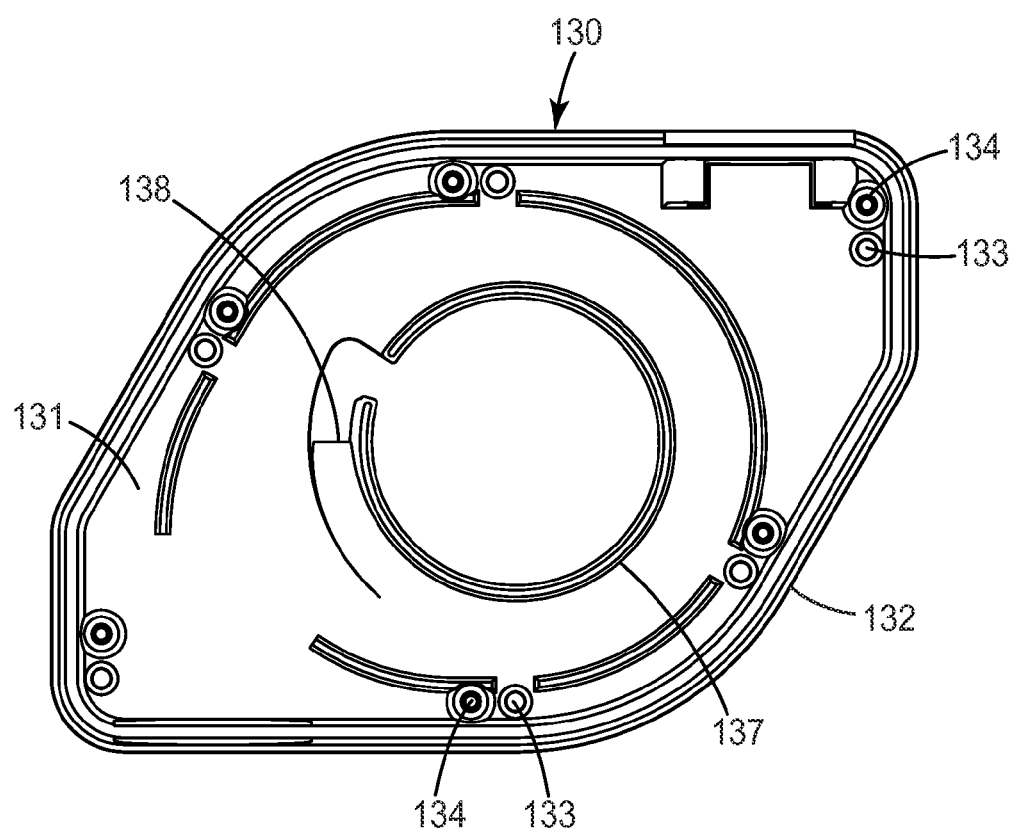

As already mentioned, the exemplary break out device 100 can include one or more furcation trays 130 depending on the number of remote radio units to be served by the breakout device. FIGS. 6A-6D are four views of an exemplary furcation tray 130 of the breakout device according to an aspect of the invention. FIG. 6A is an isometric top view of furcation tray 130. FIG. 6B is an isometric bottom view of furcation tray 130. FIG. 6C is an exploded isometric view of furcation tray 130, and FIG. 6D is top view of furcation tray 130.

The furcation tray 130 includes a bottom wall 131, a plurality of side walls 132 extending from the bottom wall and an access opening 135 extending though the bottom wall 131 of the furcation tray to permit passage of optical and electrical conductors 28, 26 through the bottom wall of the furcation tray.

The furcation tray can have a generally trapezoidal or convex quadrilateral shape as is shown in FIG. 6D. Alternatively, the furcation tray can have another shape, such as a rectangular, square, triangular, elliptical, circular or other polygonal shape so long as the shape is substantially the same as the shape of the base compartment and the cover of the exemplary device so that when all of the compartments (i.e. base compartment 120, one or more furcation trays 130 and cover 110) are assembled together in a stacked arrangement, the breakout device will have a generally constant cross-sectional shape.

To provide support and bend control for the optical fibers entering the furcation tray, furcation tray 130 can include a bend radius control ramp 138. The optical fibers can be protected from over bending as the ramp 138 includes a curved region, whose curvature is configured not to exceed the minimum bend radius of the drop cable. As shown in FIG. 4D, ramp 138 extends into the compartment disposed beneath the furcation tray into which it is guiding the optical fibers, helping reduce the profile of the furcation trays, while maintaining proper bend radius for the optical fiber cable 28. Excess optical fiber can be stored in the slack storage section of the furcation box by wrapping the fibers around hub 137.

A gasket 139 can be disposed in a channel 136 formed in the bottom wall 131 of the furcation tray 130 opposite the position where the side walls 132 extend from the bottom wall. The channel is configured to align with the side walls of the compartment (e.g. base compartment 120 or another furcation tray 130) disposed beneath the furcation tray in the stack such that the gasket residing in the channel is compressed between the channel of the furcation tray and the side wall of the compartment disposed beneath it to provide an environmental seal when the furcation tray is attached to the compartment disposed beneath it in the stack.

Furcation tray 130 can include a plurality of holes 133 disposed through bottom wall 131 that align with receiving bosses disposed in the compartment beneath it, such as receiving bosses 124 in the base compartment 120. Mechanical fasteners 180 can be put through holes 133 and into the receiving bosses to secure the furcation tray to the compartment beneath it, either the base compartment 120 or another furcation tray.

Finally, furcation tray 130 will also include a plurality of receiving bosses 134 dispersed around the circumference of the furcation tray to allow attachment of another (second) furcation tray or a cover 110 to the furcation tray by mechanical fasteners. In this manner, a plurality of furcation trays can be added to the breakout device 100 as required by a given cell tower design.

In addition, furcation tray 130 includes an optical connection interface 140 and an electrical connection interface 150 disposed in openings 132a, 132b, respectively, in the side walls 132 of the furcation tray. In an exemplary aspect, the connection interfaces are disposed in the side walls such that they are in-line or co planar with the side walls of the Furcation trays. In an alternative aspect, the connection interfaces can adopt an angled orientation with respect to the side walls of the furcation trays.

The connection interfaces allow the final connection between breakout device 100 and the remote radio unit to be made with pre-terminated jumper cables, in particular ruggedized pre-terminated jumper cables. In an exemplary aspect, the connection interfaces 140, 150 can be in the form of receptacles that are configured to accept a ruggedized optical fiber connector or a ruggedized electrical connector, respectively. The optical and electrical connection interfaces may be connected to furcation tray 130 via mechanical fasteners 182 fitted through a flange such as is shown on electrical interface 150, via a threaded fitting such as threads 140a of optical interface 140 or via another conventional mechanical attachment method.

Figure 4A:
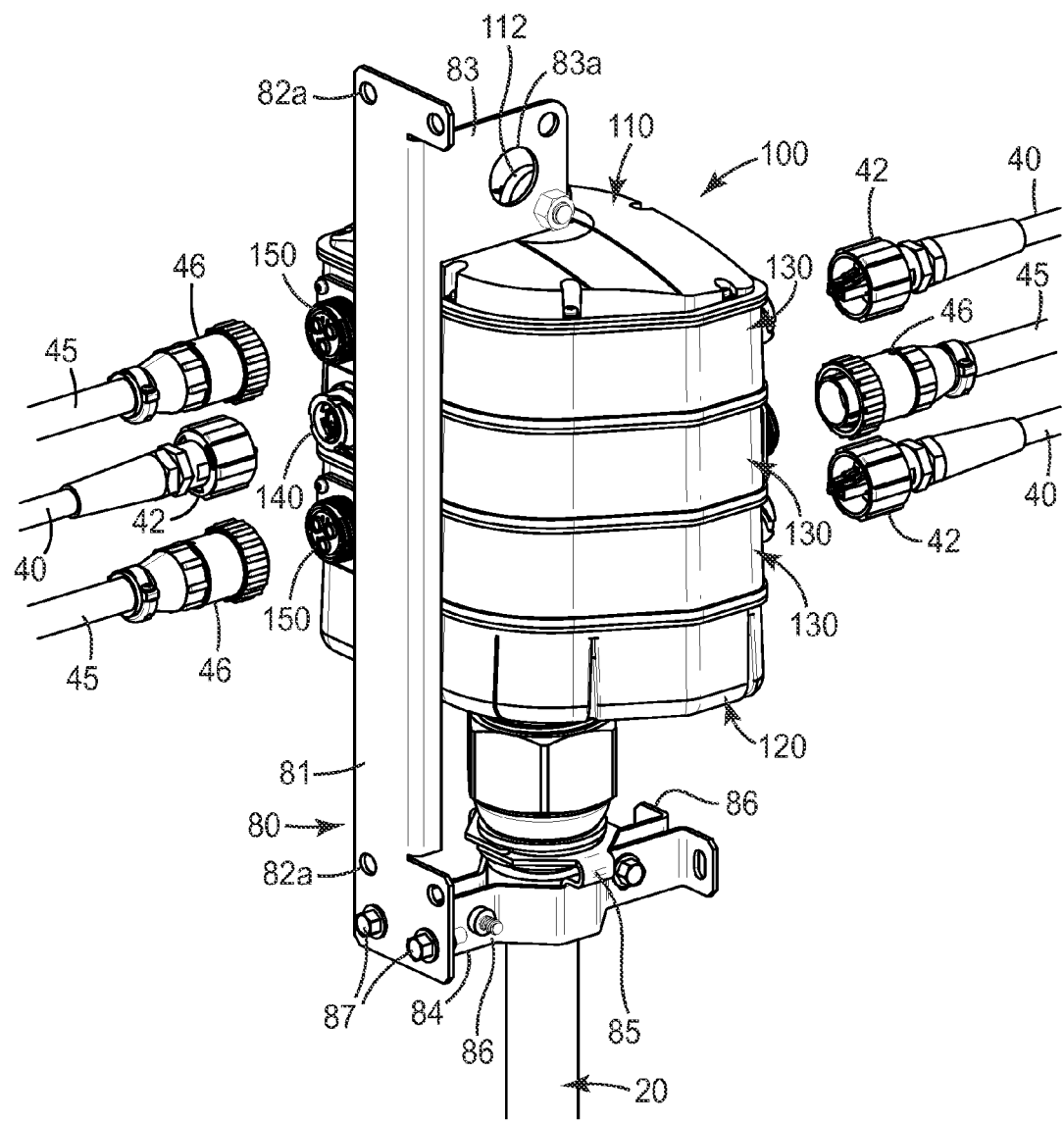
FIGS. 4A-4D are four views of an exemplary breakout device according to an aspect of the invention.
Figure 4B:
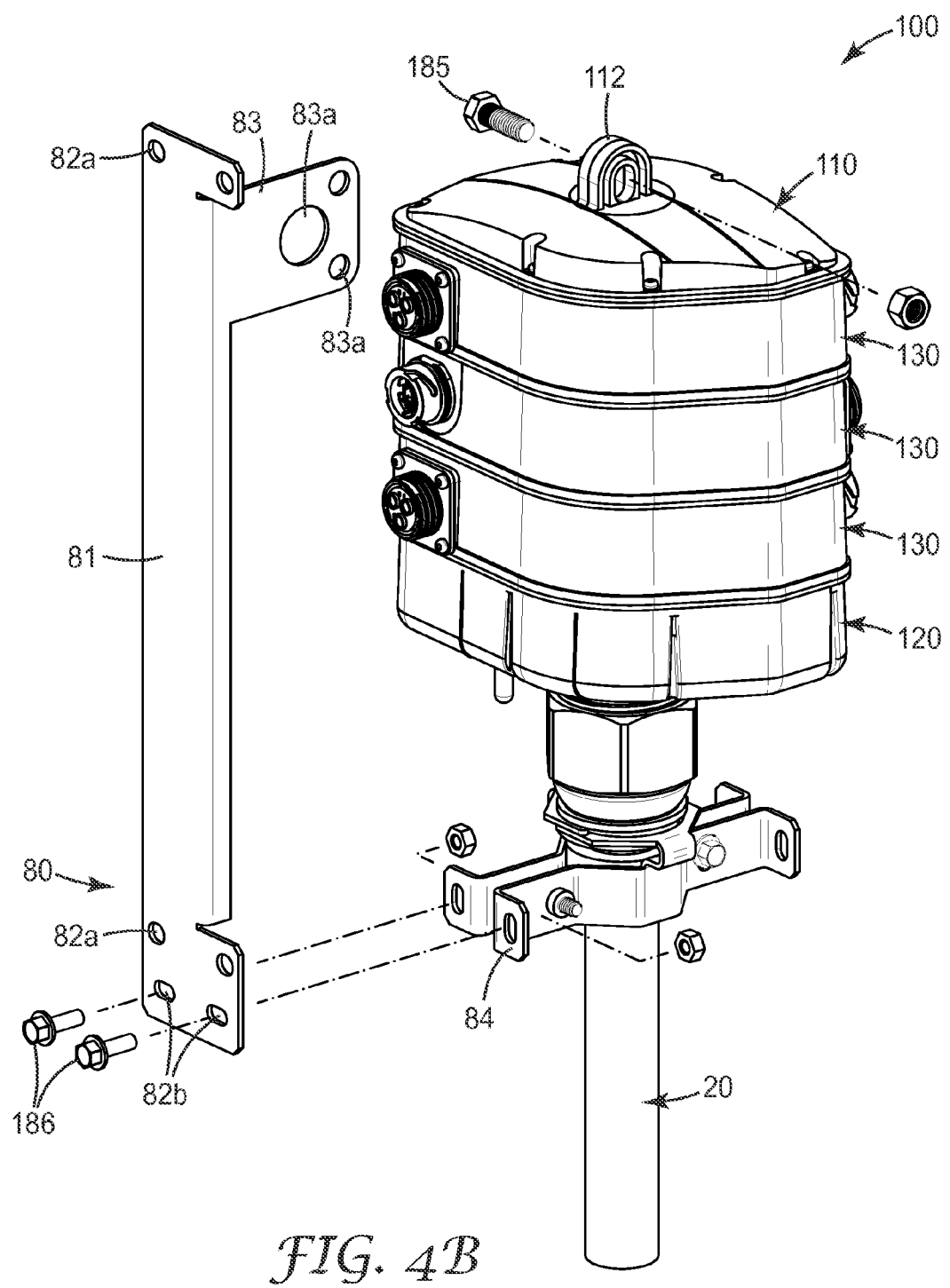
Figure 4C:
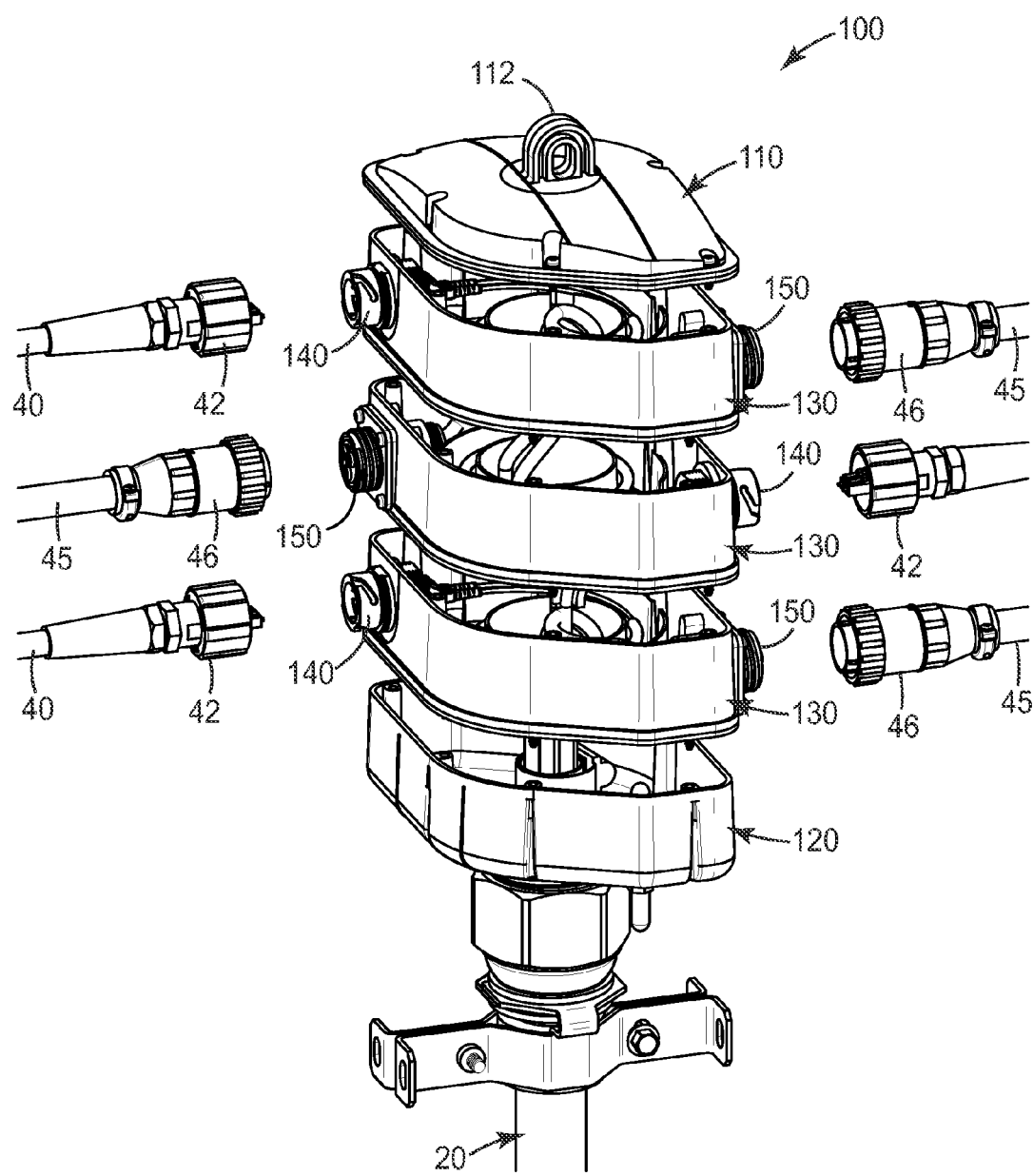
Figure 4D:
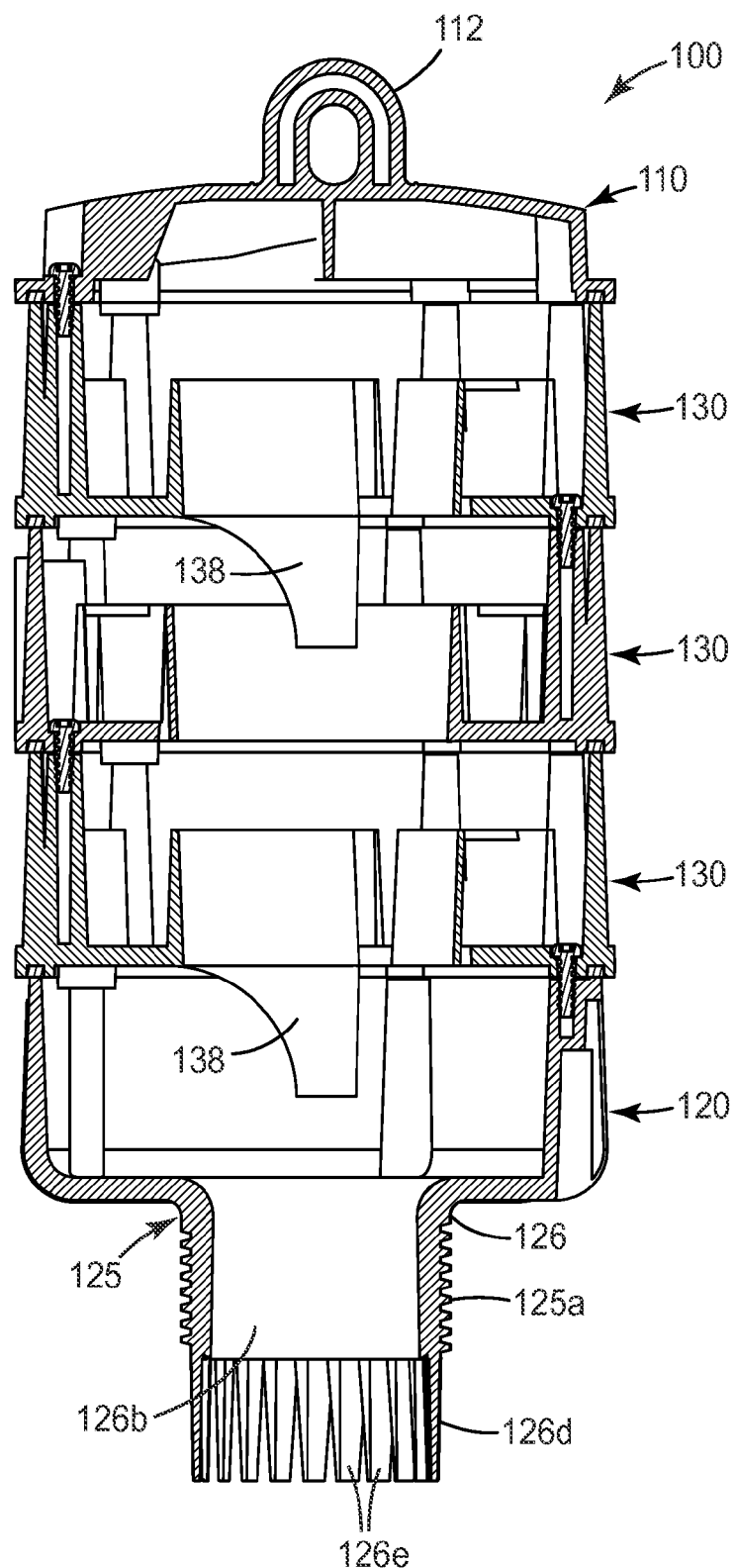
Figure 9A:
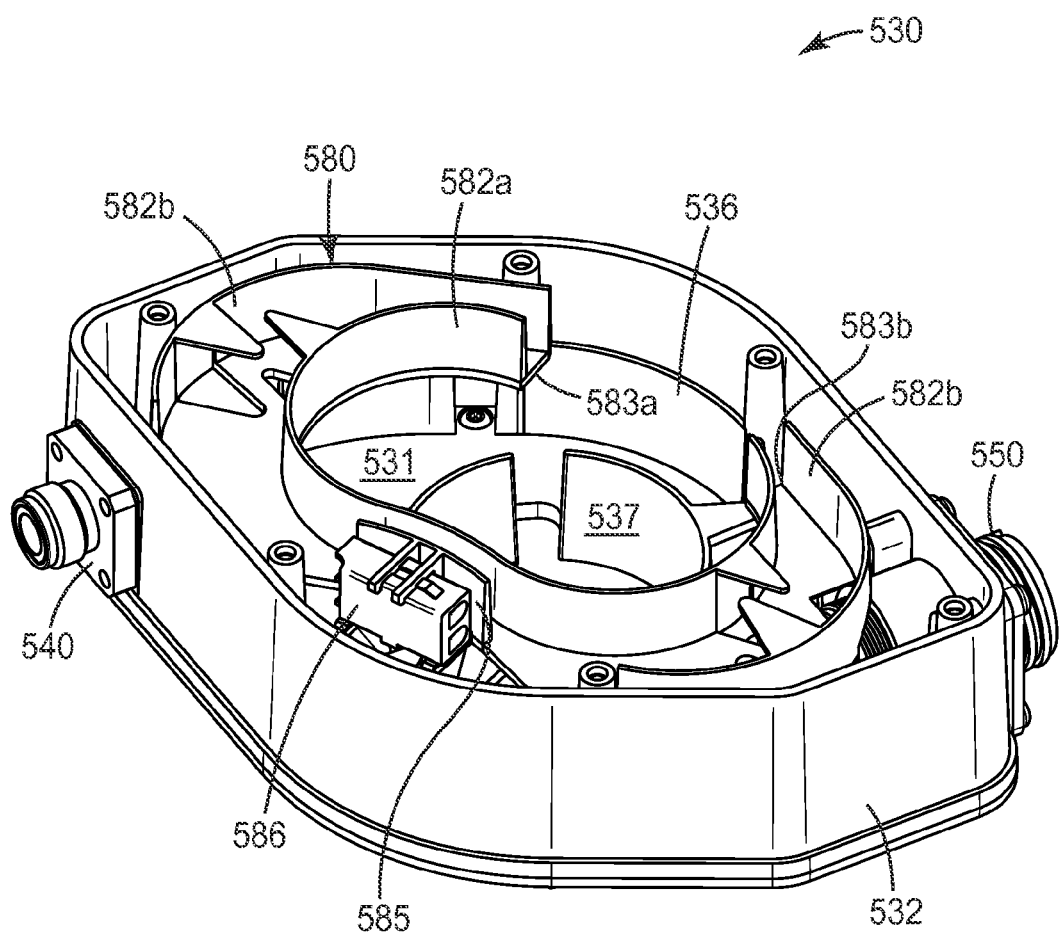
FIGS. 9A-9C are three views of another alternative furcation tray of the exemplary breakout device according to an aspect of the invention.
Figure 9B:
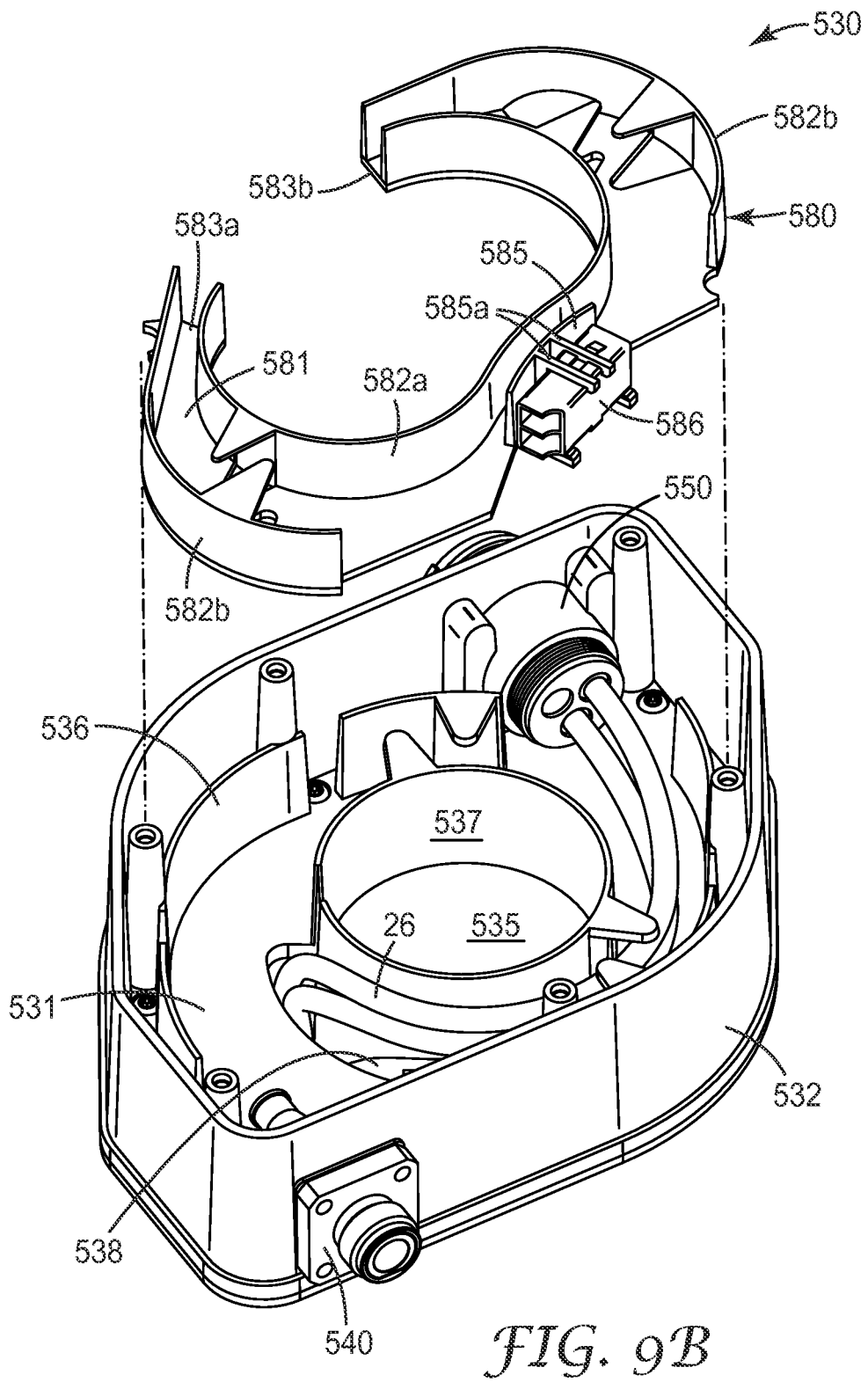
Figure 9C:
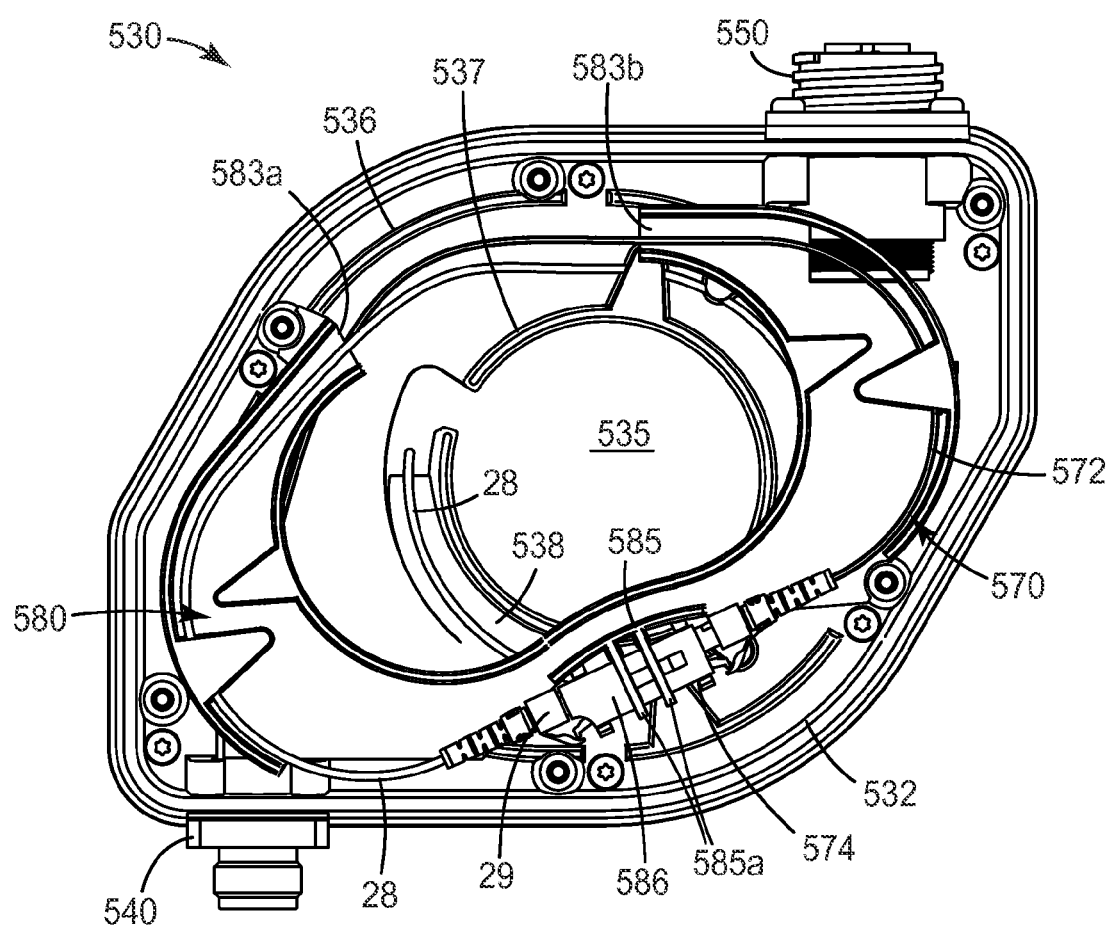

An exemplary optical connection interface can include fiber optic connector receptacles such as Sealed Circular LC ODVA Conforming Connector Receptacle (part numbers: 1828619-1 (multimode) and 1828619-2 (single mode)) available from Tyco Electronics Corporation (Berwyn, Pa.) and shown in the embodiment of FIGS. 6A-6C, a Industrial Integrated Industrial LC Duplex Adapter (Part Number: 106501-0024) available from Molex (Lisle, Ill.), or an ODC compatible socket, for example an ODC2 Socket with a square flange or an R2F SM Socket available from Radiall (Tempe, Ariz.) and shown in the embodiment of FIGS. 9A-9C, which are configured to mate with a corresponding ruggedized optical connector disposed on a terminal end of an optical fiber jumper cable 40 (FIGS. 3, 4A and 4C). Exemplary ruggedized optical connectors can include for example the Sealed Circular LC ODVA Conforming Connector (part numbers: 1828618-1 (multimode) and 1828618-2 (single mode) and the FullAXS Fiber to the Antenna Rugged Interconnect available in LC Duplex, both of which are available from Tyco Electronics Corporation, (Berwyn, Pa.) or ODC® connectors, for example an ODC2 Plug, available from Radiall (Tempe, Ariz.).

An exemplary electrical connection interface can include a ruggedized electrical receptacle such as the One-Piece Sealed Circular Plastic Connectors, Series 5 Square Flange Receptacle (part no. 788189) available from Tyco Electronics Corporation, (Berwyn, Pa.), which are configured to mate with a corresponding ruggedized electrical connector disposed on a terminal end of a jumper cable. Ruggedized electrical connectors can include for example ruggedized electrical plug such as One-Piece Sealed Circular Plastic Plug Connector, Series 5 (part no. 788188) available from Tyco Electronics Corporation, (Berwyn, Pa.).

In an exemplary aspect, the furcation trays can be stacked at an orientation that has been rotated by 180° with respect to the furcation tray disposed beneath it as shown in FIG. 4A, noting the disposition of the electrical and optical interfaces on one furcation tray with those in the tray disposed above or below it.

Figure 7A:
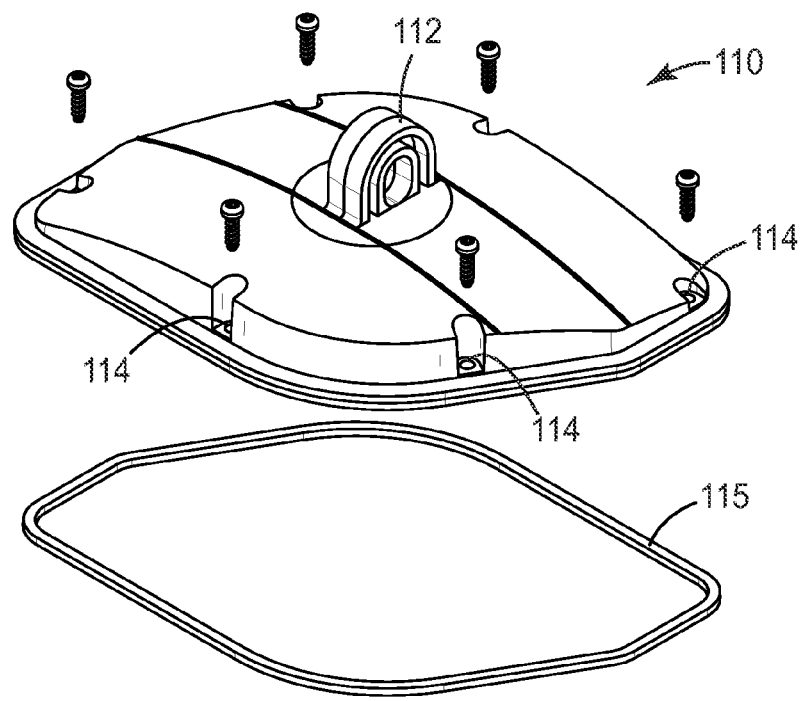
FIGS. 7A and 7B are views of two embodiments of a cover usable with the exemplary breakout device according to an aspect of the invention.

Cover 110 is shown in detail in FIG. 7A. The cover is shaped to fit onto the top of the uppermost furcation tray in the stack. The cover includes a gasket 115 disposed in a circumferential channel (not shown) on the bottom side of the cover and a plurality of openings 114 for the insertion of mechanical fasteners so that the cover can be secured to the uppermost furcation tray of the breakout device. The gasket in the circumferential channel in the cover is configured to align with the side walls of the top furcation tray 130 such that the gasket residing in the channel is compressed between the cover and the side wall of the of the top furcation tray to provide an environmental seal when the cover is attached to the housing of the breakout device. In an exemplary aspect cover 110 can include a separate ring shaped gasket as shown in FIG. 7A.

Figure 7B:
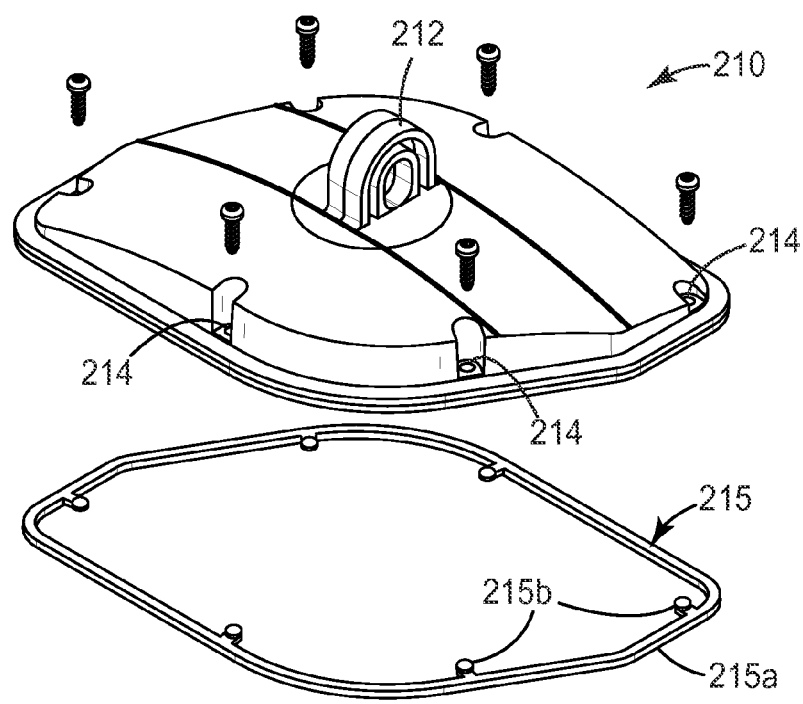

In an alternative embodiment, cover 210 can include a formed in-place gasket 215 shown in an exploded view in FIG. 7B. The cover and the formed in-place gasket can be made using a conventional two step injection molding. One advantage to this approach is the ability to make more complex gasket designs. For example, formed in-place gasket 215 has a ring shaped portion 215a that is configured to be disposed in a circumferential channel (not shown) on the bottom side of the cover and a plurality of lug portions 215b disposed adjacent to openings 214 through the cover. The lug portions provide an environmental seal around the mechanical fasteners that are inserted through openings 214 and used to secure the cover to the uppermost furcation tray of exemplary breakout device.

Cover 110 can further include an eyelet 112 extending from the top surface of the cover. The eyelet can be used to help secure the breakout device to the mounting bracket 80 that secures the breakout device to the cell tower. In an exemplary aspect, the mounting bracket can be attached to the breakout device on the ground prior to lifting the breakout device and attached trunk cable up to its position in the tower. In this aspect, the mounting bracket can also be used as a lifting harness for the exemplary breakout device.

Aspects of an exemplary mounting bracket 80 are shown in detail in FIGS. 4A, 4B, 5A and 5B. Mounting bracket 80 includes a mounting portion 81 and a cable clamping portion 84. The mounting portion can be generally L-shaped having long body portion and a short attachment arm 83 extending therefrom. A bolt 185 can be passed through the eyelet 112 in the cover 110 and an opening 83a in the attachment arm to serve as a first connection point between the breakout device and the mounting bracket. The attachment arm can further include a second, larger opening 84 that can accommodate a hook (not shown) attached to a cable from a crane that is used to lift the breakout device to its mounting location up on the cell tower.

The long body portion of mounting portion 81 can include a plurality of mounting holes 82a that are used to attach the mounting bracket to the cell tower via bolts as shown in FIG. 3. In the exemplary aspect shown in FIGS. 4A and 4B, the mounting bracket has a pair of mounting holes disposed near either end of the long body portion of mounting bracket 81.

In addition, the long body portion of mounting portion 81 includes cable clamp attachment features such as holes 82b disposed on the end of the long body portion opposite the attachment arm 83.

The cable clamping portion clamps the trunk cable 20 between two cable holders 86. Each cable holder 86 includes a flange 86a at least one end thereof and a recessed portion 86b disposed between the flange portions. The recessed portions of the cable holder can be configured to clamp onto trunk cable 20 when mechanical fasteners inserted through holes 84b are tightened in place. In an exemplary aspect, an elastomeric grommet 90 can be placed around trunk cable 20 between the cable holders and the trunk cable to provide added gripping. The cable clamping portion is attached to the mounting portion of bracket 80 via mechanical fasteners 186 (i.e. a bolt and corresponding nut) inserted through holes 82b disposed on the end of the long body portion and holes 84a disposed in the flanges of the cable holders.

In an exemplary aspect, each cable holder can include a forked projection 85 extending from the recessed portion via neck 85b and configured to interact with a groove 179 disposed in the external surface of clamping nut 170, shown in FIG. 5A. The forked projection includes a pair of fingers 85a that fit in the slot 179 such that they extend around the clamping nut 170. Advantageously, the exemplary cable holder can securely grip the trunk cable while still allowing the clamping nut to rotate so that it can be tightened onto the breakout device 100. In this way, mounting bracket 80 supports breakout device 100 at both its top via cover 110 and its bottom via clamping nut 170.

Figure 8A:
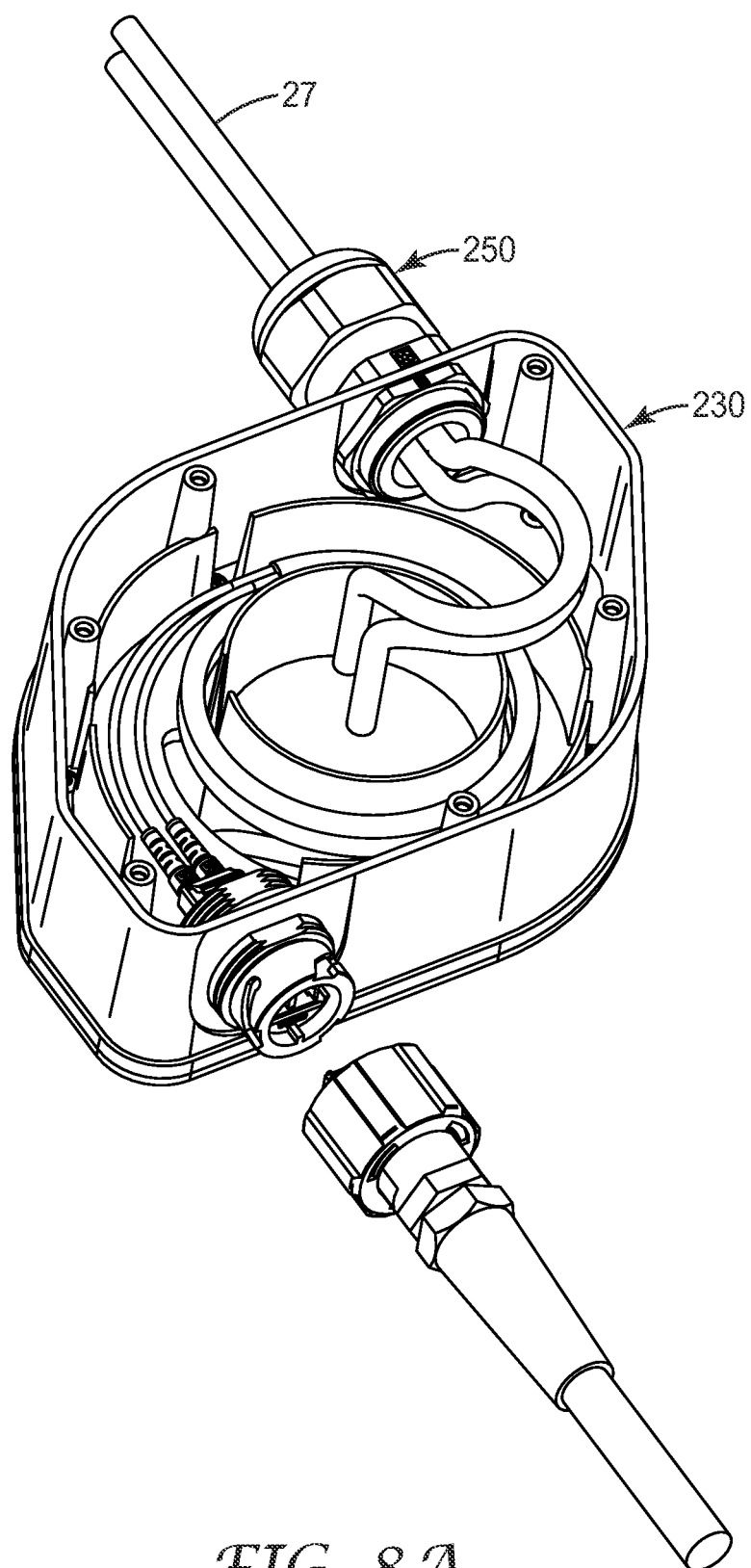
FIGS. 8A and 8B are two views of an alternative furcation tray of the exemplary breakout device according to an aspect of the invention.
Figure 8B:
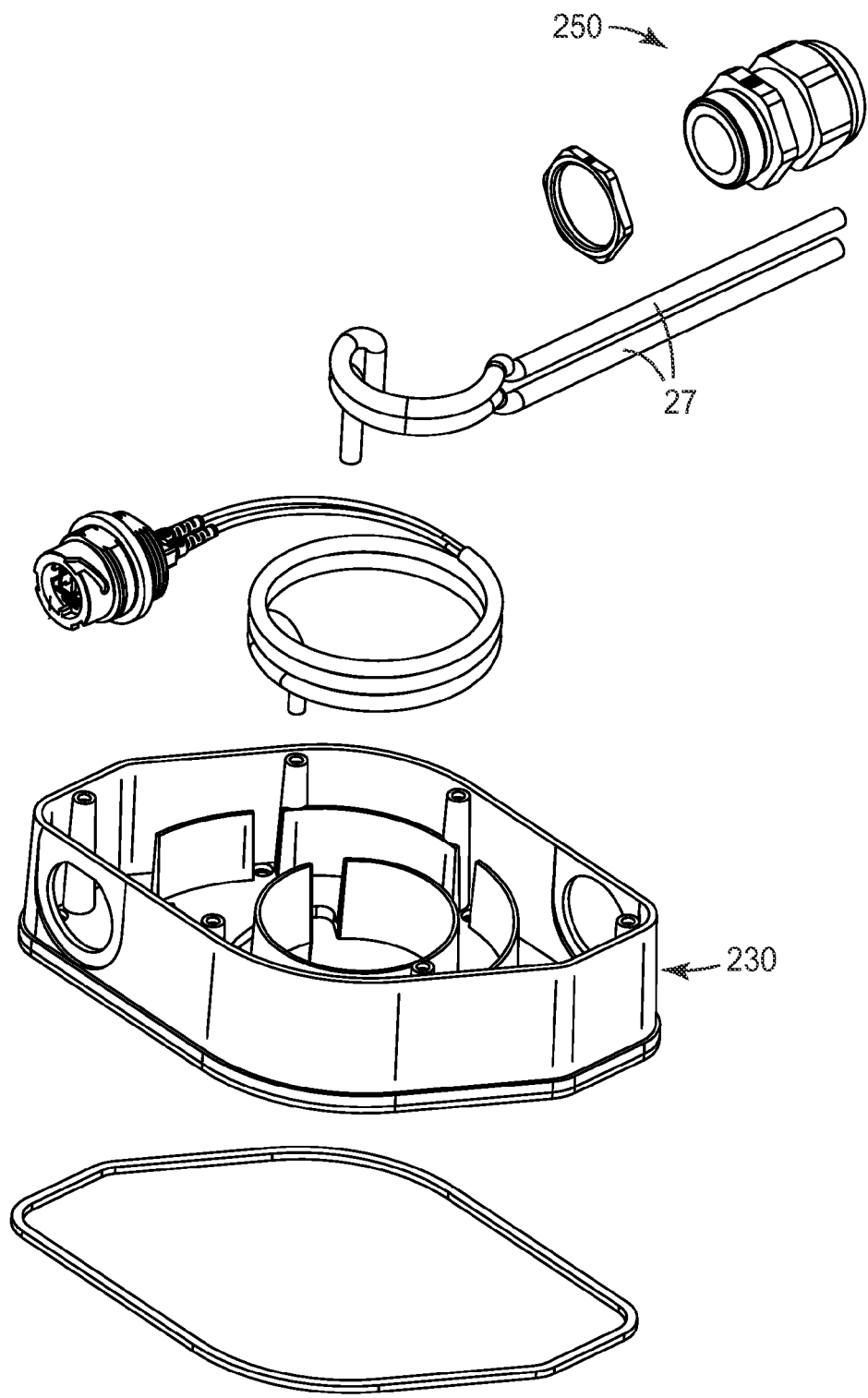

FIGS. 8A and 8B show an alternative furcation tray 230 where the electrical interface has been changed to a cable compression gland 250 utilizing a two hole grommet (not shown) to allow passage of two electrical conductors 27 from the trunk cable to pass therethrough.

In some cell tower installations, separate optical and electrical conductor cables can be used as the trunk cables.

FIGS. 9A-9C show another alternative furcation tray 530 which utilizes an ODC compatible socket 540, for example an R2F SM Socket available from Radiall (Tempe, Ariz.) and an LC-duplex to ODC transition cable or an R2F SM ODC Socket with an integral LC-duplex pigtail 570. Furcation tray 530 is similar to furcation tray 130 (FIGS. 6A-6C) in basic structure in that the furcation tray 530 includes a bottom wall 531, a plurality of side walls 532 extending from the bottom wall, an access opening 535 extending though the bottom wall of the furcation tray to permit passage of optical and electrical conductors 28, 26 through the bottom wall of the furcation tray and a ramp 538 adjacent to the access opening to provide support for the optical and electrical conductors entering the furcation tray as well as bend control for the optical fibers entering the furcation tray.

Furcation tray 530 includes an ODC optical connection interface or socket 540 and an electrical connection interface 550 disposed in openings in the side walls 532 of the furcation tray. The connection interfaces allow the final connection between breakout device and the remote radio unit to be made with pre-terminated jumper cables, in particular ruggedized pre-terminated jumper cables. In particular, the ODC Socket 540 with an integral LC-duplex pigtail 570 can be disposed within the furcation tray and can be used to interconnect an LC pre-terminated trunk cable (such as trunk cable 20 shown in FIG. 2) to the external ODC jumper cable that runs to the remote radio unit disposed on the tower.

Specifically, furcation tray 530 can include an LC adapter plate 580 that is configured to rest on top of the hub 537 and guide walls 536 to create a second level within the furcation tray. In the exemplary embodiment shown in FIGS. 9A-9C, LC adapter plate 580 can be generally C-shaped. The LC adapter plate includes a base plate 581 having inner and outer guide walls 582a, 582b extending therefrom. The inner and outer guide walls define cable entries 583a, 583b where the optical fibers 28 from the trunk cable and LC-duplex pigtail 570 can enter and exit the LC adapter plate.

ODC Socket with an integral LC-duplex pigtail includes a short length of optical fiber cable 572 that is terminated in the ODC connection interface or socket 540 on one terminal end and is terminated by one or more standard format optical connectors disposed on the second terminal end, for example an LC-duplex optical connector 574. In an alternative aspect the connector on the second terminal end can have another standard format, such as an ST, SC, FC or MPO format depending on the number of optical fibers in ODC transition cable/pigtail and the type of connector disposed on the optical fiber cables in the trunk cable. An exemplary ODC transition cable is the ODC2 Plug/Duplex LC plug cable harness and an exemplary ODC socket with an integral LC-duplex pigtail, such as R2F SM Socket/LC Duplex Patchcord 1 m (part no. F760 855 220), both of which are available from Radiall (Tempe, Ariz.).

LC adapter plate 580 can include an LC adapter holder 585 comprising a plurality of latch arms 585a that is configured to securely hold LC adapter 586. Note that the outer guide wall may be discontinuous in proximity of the LC adapter holder 585 to facilitate inserting and removing the LC connectors 29 and 574 disposed on the optical cable 28 from the trunk cable and on the second terminal end of the LC-duplex pigtail 570, respectively.

FIG. 9B shows how electrical conductors 26 can enter furcation tray 530 via ramp 538. The electrical conductors can be routed around hub 537 and be terminated to the electrical connection interface 550.

FIG. 9C shows how the optical fibers are routed in furcation tray. Dual fiber optical cable 28 enters furcation tray 530 via ramp 538 and routed around hub 537 until it is transitioned into the LC-adapter plate 580 through cable entry 583a. Optical cable 28 is routed around LC adapter plate 580 to the LC adapter holder 585. The LC-duplex connector mounted on the terminal end of optical cable 28 is inserted into a first side of LC adapter 586 until it is fully engaged. LC duplex connector 574 of the LC-duplex pigtail 570 is plugged in the second side of the LC adapter. The LC-duplex pigtail is routed through the LC adapter plate until it exits the LC adapter plate through cable entry 583b. The ODC LC-duplex pigtail is routed around hub 537 where it terminated at the wall 532 of the furcation tray in the ODC connection interface 540.

In an alternative aspect, LC adapter holder 585 can be replaced by any other suitable connector adapter (LC simplex, SC, ST, MPO, etc) to match the optical connectors disposed on the optical fibers from the trunk cable and from the ODC pigtail or an ODC transition cable. In an alternative aspect, the optical fibers from the trunk cable and from an ODC transition cable can be directly spliced via a conventional fusion or mechanical splice. In this case, LC adapter holder 585 can be replaced with a suitable splice holder.

Figure 10:
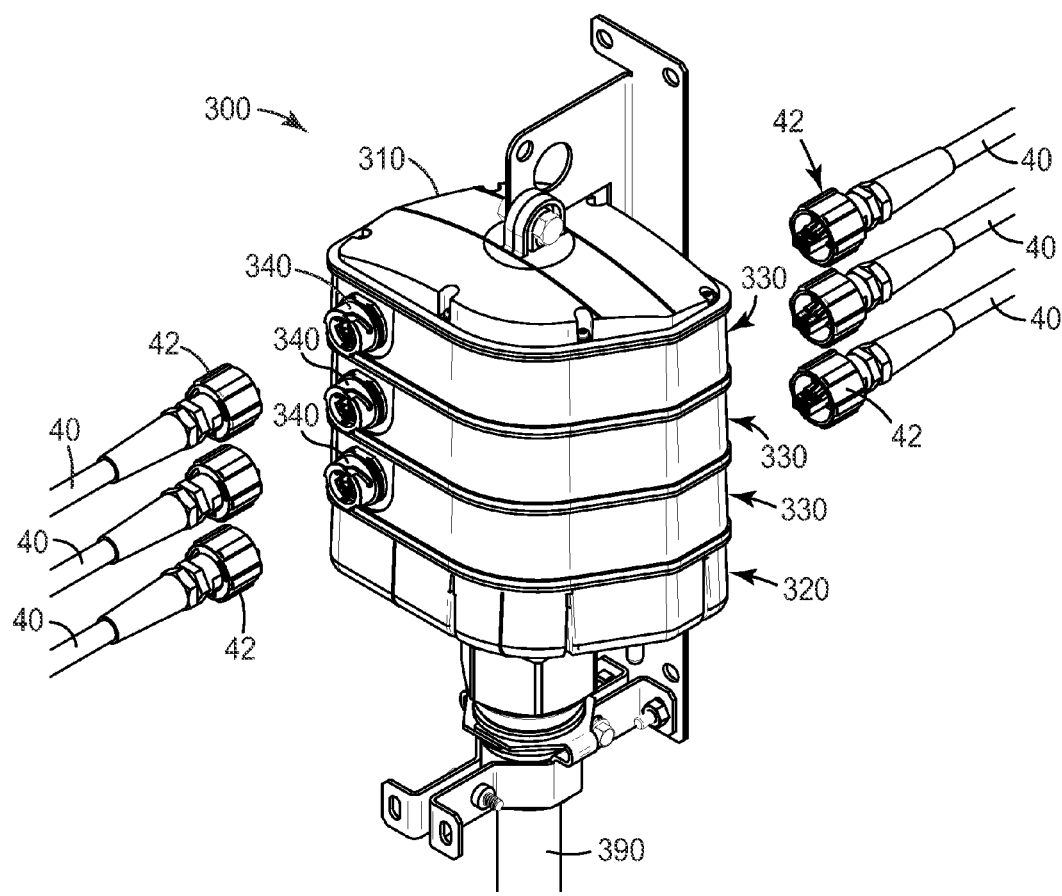
FIG. 10 is an isometric view of an alternative embodiment of an exemplary breakout device according to an aspect of the invention.

FIG. 10 shows another embodiment of an exemplary breakout device 300 in accordance with the present invention that is configured for use with a multifiber optical trunk cable 390. Break out device 300 has a housing made up of a plurality of individual compartments 320, 330 stacked one upon another and a cover 310 that is attachable to the housing. The plurality of individual compartments includes a base compartment 320 and at least one furcation tray 330. In the exemplary break out device shown in FIG. 10, break out device 300 can be configured to serve three remote radio units that require two LC-duplex connections or six remote radio units that require one LC-duplex connection. The modular design of breakout device 300 enables capacity customization (i.e. the ability to service additional remote radio units) by simply adding additional furcation trays to the housing. Any additional furcation trays can be added to the stacked housing between the base compartment 320 and the cover 310 to increase the capacity of the device.

Each furcation tray 330 can be similar to the furcation trays described earlier except that furcation tray 330 includes two optical connection interfaces 340 rather than one optical and one electrical connection interface as shown in breakout-device 100 (FIGS. 4A-4D). A duplex LC fiber jumper 40 having ruggedized optical connectors 42 disposed on the terminal end thereof can be used to connect each optical interface to a remote radio unit.

Figure 11:
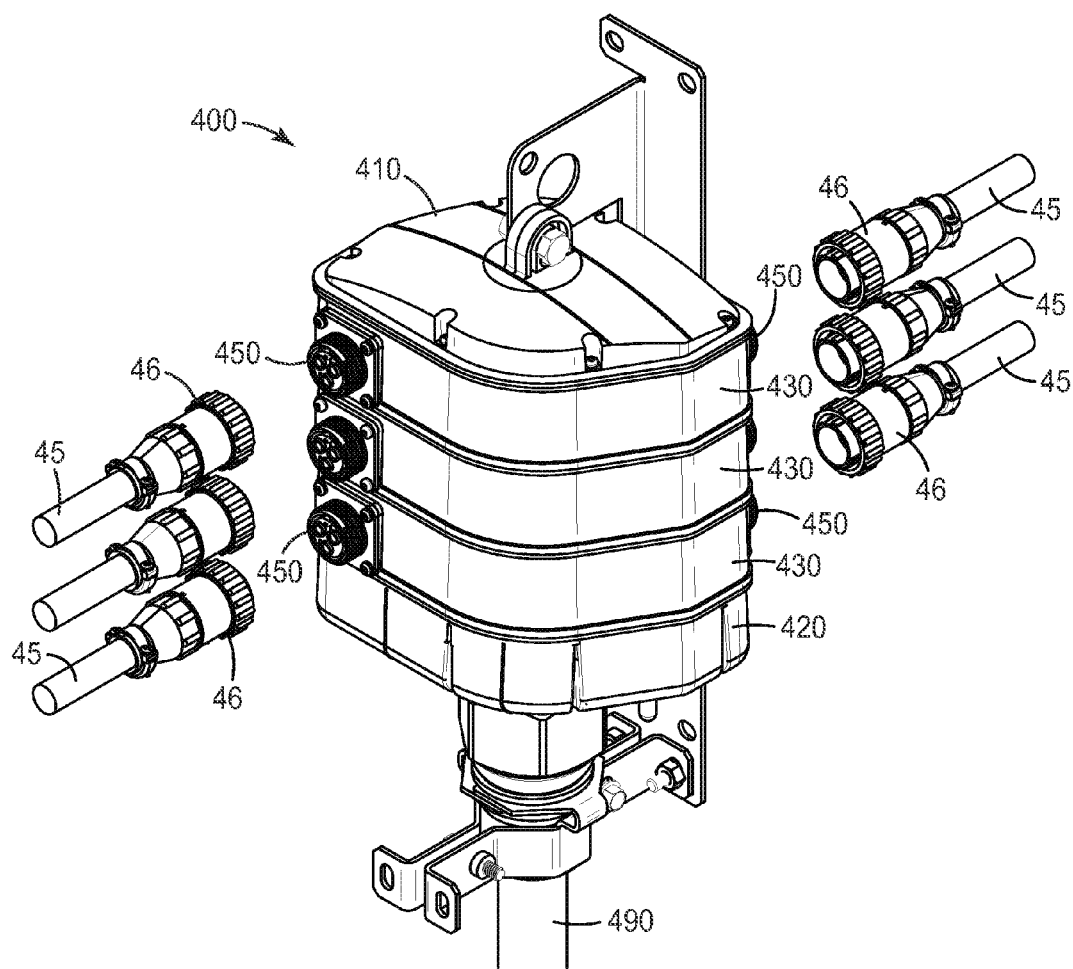
FIG. 11 is an isometric view of another embodiment of an exemplary breakout device according to an aspect of the invention.

Similarly, FIG. 11 shows an embodiment of an exemplary breakout device 400 in accordance with the present invention that is configured for use with a multi-electrical conductor trunk cable 490 that is capable of providing power for up to six remote radio units or other equipment disposed on the cell tower. Break out device 400 has a housing made up of a plurality of individual compartments 420, 430 stacked one upon another and a cover 410 that is attachable to the housing. The plurality of individual compartments includes a base compartment 420 and at least one furcation tray 430. The modular design of breakout device 400 enables capacity customization (i.e. the ability to service additional remote radio units) by simply adding additional furcation trays to the housing. Any additional furcation trays 430 can be added to the stacked housing between the base compartment 420 and the cover 410 to increase the capacity of the device.

Each furcation tray 430 can be similar to the furcation trays described earlier except that furcation tray 430 includes two electrical connection interfaces 450 rather than one optical and one electrical connection interface as shown in breakout-device 100 (FIGS. 4A-4D). An electrical jumper 45 having ruggedized connectors 46 disposed on the terminal end thereof can be used to connect each electrical interface to provide power to a remote radio unit.

In an alternative embodiment, the type of connection interface can be segregated into different furcation trays such that you can have a first furcation tray having a pair of first connection interfaces that are in the form of two electrical connection interfaces and a second furcation tray having a pair of second connection interfaces that are in the form of two optical connection interfaces.

Figure 12:
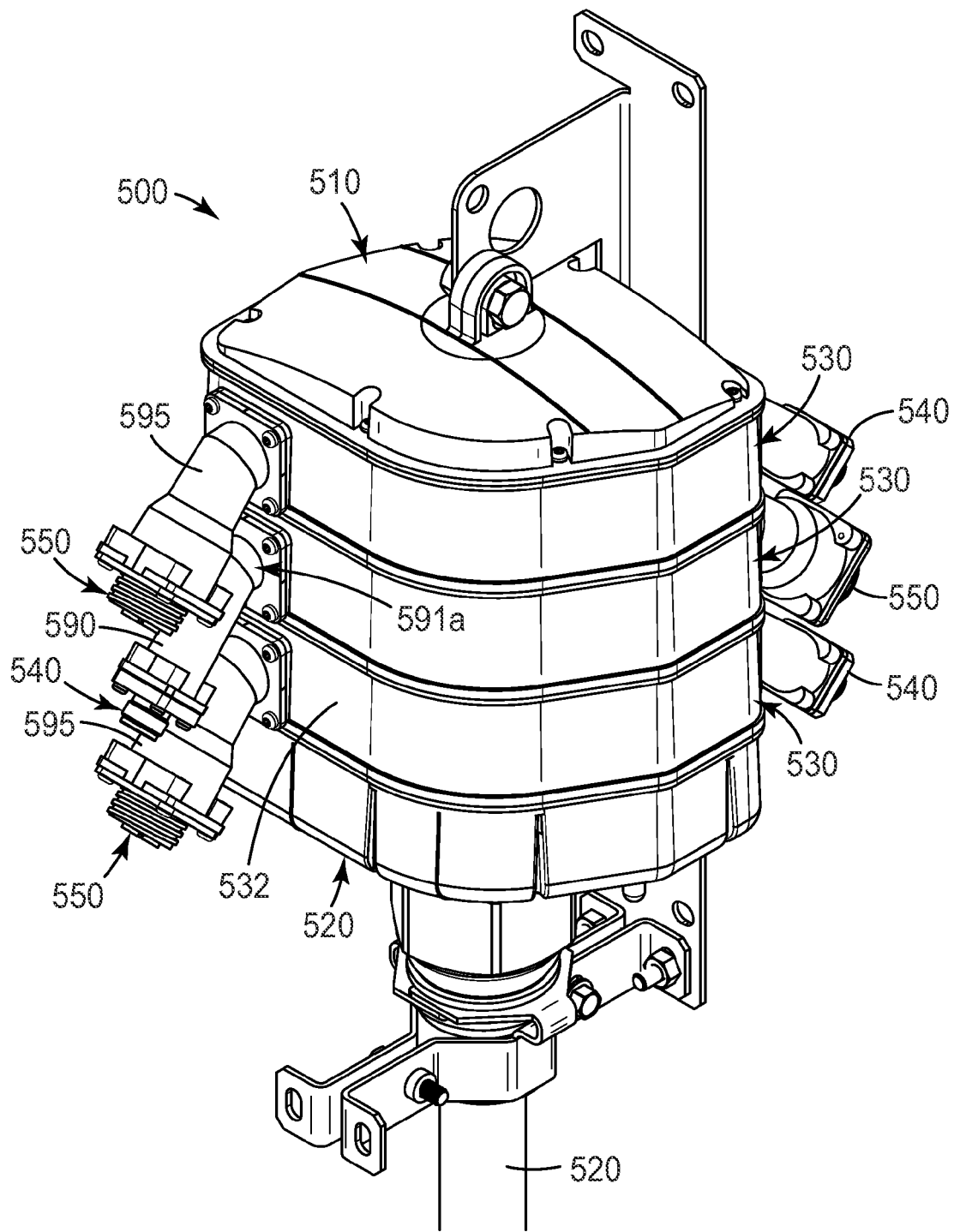
FIG. 12 is an isometric view of yet another embodiment of an exemplary breakout device according to an aspect of the invention.

Some cell tower installations may require that the optical and electrical connection interfaces be angled with respect to the furcation tray rather than being in-line or coplanar with the wall of the furcation tray as described previously. FIG. 12 shows another embodiment of an exemplary breakout device 500 in accordance with the present invention that is configured for use with a distribution or trunk cable 520. Break out device 500 has a housing made up of a plurality of individual compartments 520, 530 stacked one upon another and a cover 510 that is attachable to the housing. The plurality of individual compartments includes a base compartment 520 and at least one furcation tray 530 as described previously. Break out device 500 can be configured to serve three remote radio units. The modular design of breakout device 500 enables capacity customization (i.e. the ability to service additional remote radio units) by simply removing furcation trays or adding additional furcation trays to the housing. Any additional furcation trays can be added to the stacked housing between the base compartment 520 and the cover 510 to increase the capacity of the device.

Figure 13:
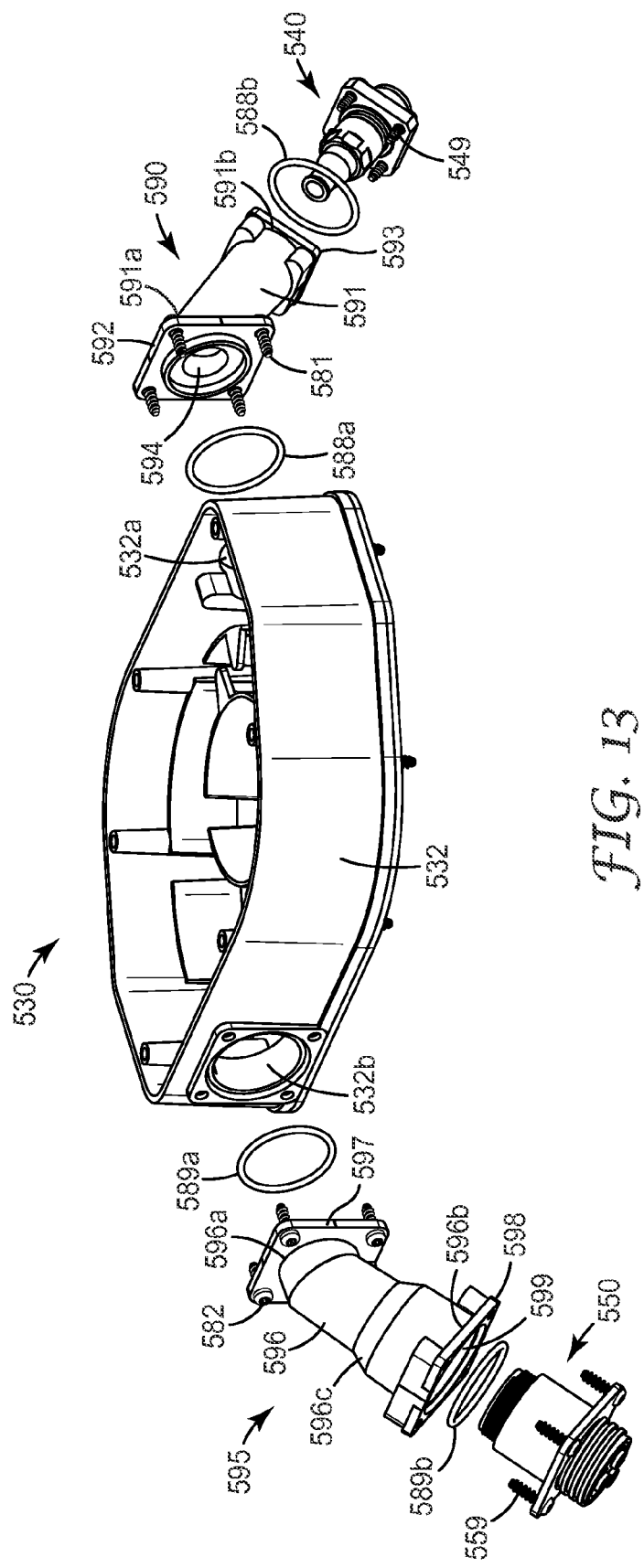
FIG. 13 is an exploded view of a furcation tray utilized in the break out device of FIG. 12.

Referring to FIGS. 12 and 13, each furcation tray 530 can be similar to the furcation trays described earlier except that furcation tray 530 includes two elbow adapters 590, 595 disposed between the wall of the furcation tray and the optical and electrical connection interfaces 540, 550 rather than having the optical and electrical connection interfaces attached directly to the wall of the furcation tray as shown in breakout-device 100 in FIGS. 4A-4D.

Each elbow adapter 590, 595 includes an angled tubular portion 591, 596 having a passageway 594, 599 extending therethrough, a first flange 592, 597 disposed at a first end 591a, 596a of the angled tubular portion and a second flange 593, 598 disposed at a second end 591b, 596b of the angled tubular portion.

The first flange 592 of elbow adapter 590 is configured to attach to side wall 532 of furcation tray 530 over opening 532a for example by mechanical fasteners such as screws 581. Optical connection interface 540 can be attached to the second flange 593 of the elbow adapter for example by mechanical fasteners such as screws 549. The passageway 594 of the angled tubular portion 591 is configured to accommodate the back portion of connection interface 540 therein. Sealing members 588a, 588b can be disposed between the first flange and side wall 532 and between the second flange and the connection interface 540, respectively, to prevent the ingress of moisture and dirt through these joints.

Similarly, first flange 597 of elbow adapter 595 is configured to attach to side wall 532 of furcation tray 530 over opening 532b for example by mechanical fasteners such as screws 582. Optical connection interface 550 can be attached to the second flange 598 of the elbow adapter for example by mechanical fasteners such as screws 559. The passageway 599 of the angled tubular portion 596 is configured to accommodate the back portion of connection interface 550 therein. In the case of elbow adapter 595, the angled tubular portion 596 can include a transition portion 596c to increase the diameter of the angled tubular portion at its second end so that connection interface 550 can be inserted into the second end of passageway 599. Sealing members 589a, 589b can be disposed between the first flange 597 and side wall 532 and between the second flange 598 and the connection interface 550, respectively, to prevent the ingress of moisture and dirt though these joints.

Advantageously, elbow adapters can orient connection interfaces 540, 550 at an angle relative to the bottom wall of the furcation tray 530 to which they are attached. In an exemplary aspect, the connection interfaces can be disposed at an angle of about 30° to about 90°, preferably at an angle of about 45° to about 60°. Angling the connection interfaces down as shown in FIG. 12 can be advantageous when the break-out device is disposed higher on the tower than the remote radio units to which it is being connected. Additionally, angling the connection interfaces in this manner can provide a degree of protection to the connection between the optical electrical jumpers and the connection interfaces from falling objects. For example if a technician is working higher up on the tower and drops a tool, the falling tool will contact the angled elbow and be deflected rather than the falling tool contacting the connector on one of the optical or electrical jumper cables where it connects to the connection interface, which could dislodge the jumper cable connection or disrupt the signal/power to the remote radio unit.

Also contemplated but not shown in the figures, is modification of the furcation tray to include an angled wall portion around openings (for example, openings 532a, 532b shown in FIG. 13) where the connection interfaces pass through the wall of the furcation tray at an angled orientation. The angled wall portions can be disposed such that the connection interfaces are disposed at a downward angle similar to that shown in FIG. 13. Alternatively, the angled wall portions can be disposed such that the connection interfaces are angled with respect to the side wall of the furcation tray rather than being disposed orthogonal to the side wall of the furcation tray.

Figure 14:
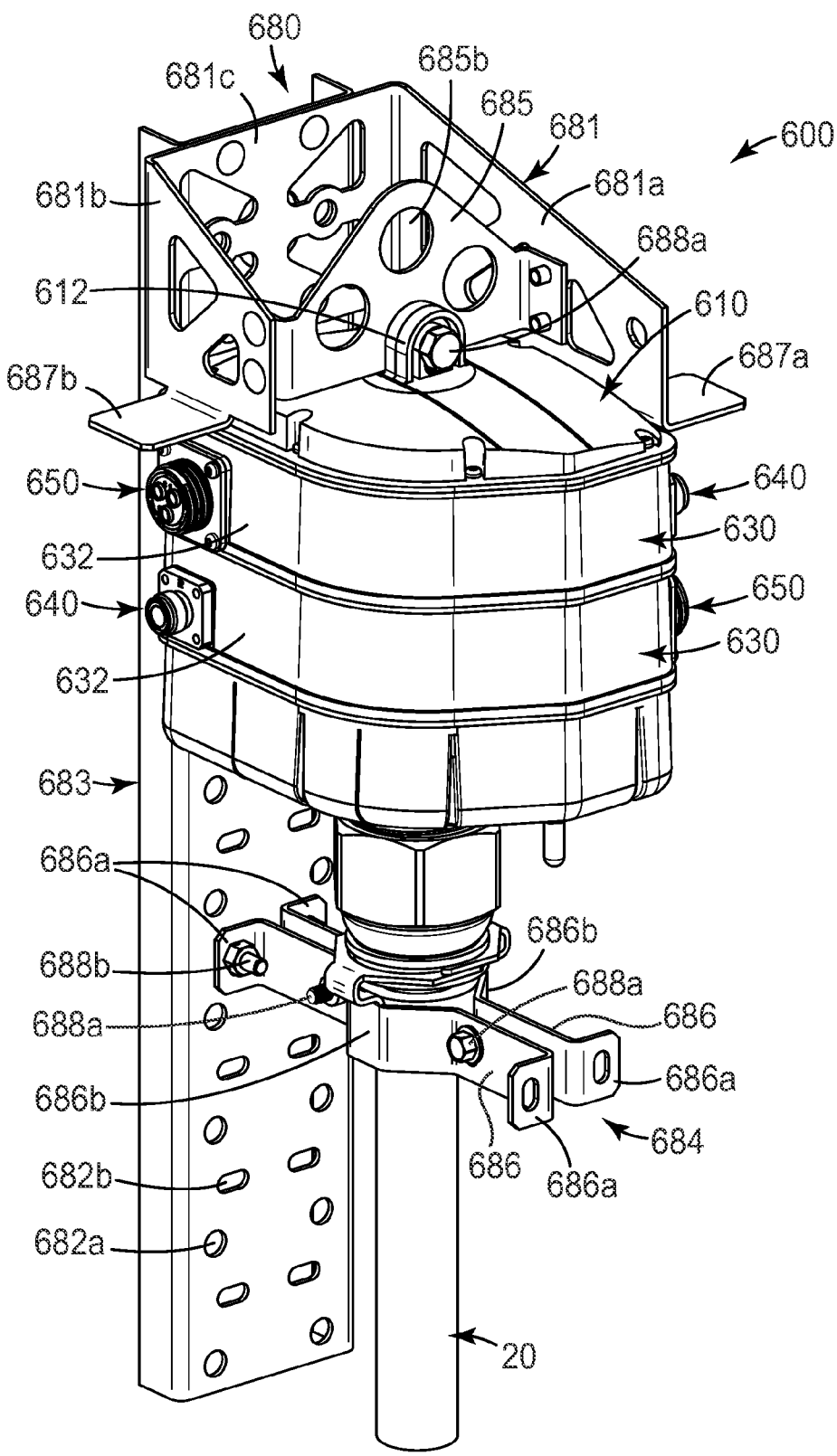
FIG. 14 shows an alternative mounting bracket for use with the exemplary breakout devices according to an aspect of the invention.

As mentioned previously, the exemplary breakout device can be attached to a cell tower or other cellular station superstructure by a mounting bracket. FIG. 14 shows another mounting bracket 680 configured for use with the exemplary modular breakout device 600. Breakout device 600 is essentially analogous to breakout device 100 described previously except that breakout device 600 is configured to service two remote radio units (i.e. has two furcation trays 630) rather than the three remote radio units served by breakout device 100.

Mounting bracket 680 includes a header portion 681 that is attached to a spine portion 683 of the mounting bracket and a cable clamping portion 684 which is attached lower on the spine portion than the header portion. In one exemplary aspect, the spine portion can be a plate or a piece of channel iron having a plurality of mounting holes or openings 682a, 682b disposed along its length. The header portion which attaches to the cover 610 of breakout device 600 and the cable clamping portion 684 can be attached to the spine portion by mechanical fasteners inserted through openings 682a, 682b, respectively. Any unused openings 682a, 682b through the spine portion can be used to attach the mounting bracket to the cell tower by mechanical fasteners, by conventional clamps (not shown) or a combination thereof.

Header portion 681 can be attached to spine portion 683 near the top end thereof. The header portion can have a ⌐-shaped structure that includes a long side portion 681a and a short side portion 681b connected by base portion 681c. In an alternative aspect, the header portion can have a ⋃-shaped structure (not shown) that includes a flat base portion and two equal length side portions. Mechanical fasteners such as screws, rivets, or bolts can be passed through the base portion of the header portion 681 to connect the header portion to spine portion 683. A cross member 685 can connect long side portion 681a and a short side portion 681b and can be attached to eyelet 612 in the cover 610. A bolt 688a can be passed through the eyelet 612 in the cover 610 and an opening in the cross member to connect breakout device 600 to the mounting bracket 680. Cross member 685 can further include one or more large openings 685b that can accommodate a hook (not shown) attached to a cable from a crane that can be used to lift the breakout device to its mounting location up on a cell tower. In an alternative aspect, spot welding can be used to assemble portions of the mounting bracket. For example, the base portion of the header portion can be spot welded to spine portion and cross member can be spot welded to the long side portion and the short side portion of the header portion.

In an exemplary embodiment, protection tabs 687a, 687b can extend laterally from long side portion 681a and a short side portion 681b, respectively. The protection tabs extend over connection interfaces 640, 650 disposed in the sidewalls 632 of furcation trays 630 to protect the connectors on the jumpers from falling objects. Protection tabs 687a, 687b will deflect any falling objects that may have been dropped or come off of the tower at a higher location thus protecting the jumper connections to the exemplary breakout device.

Cable clamping portion 684 is analogous to cable clamping portion 84 described in reference to FIGS. 4A, 4B and 5A. The cable clamping portion clamps the trunk cable 20 between two cable holders 686. Each cable holder 686 includes a flange 686a on each end thereof and a recessed portion 686b disposed between the flanges. The recessed portions of the cable holders can be configured to clamp onto trunk cable 20 when mechanical fasteners 688a inserted through holes in the two cable holders and tightened in place. The cable clamping portion 684 is attached to the spine portion of bracket 683 via mechanical fasteners 688b (i.e. a bolt and corresponding nut) inserted through holes 682b disposed on the end of the long body portion and holes disposed in the flanges of the cable holders.

In an exemplary aspect, spine portion 683 can include a plurality of sets of holes 682b to accommodate the modularity of breakout device 600. If additional furcation trays are added, cable clamping portion 684 would be attached lower on the spine portion than is shown in FIG. 14. If the exemplary breakout device includes only a single furcation tray the cable clamp would be attached higher on the spine portion than is shown in FIG. 14.

FIGS. 15A-15D show four views of another exemplary breakout device 700 in accordance with the present invention. Break out device 700 has a housing made up of a plurality of individual compartments 720, 730 stacked one upon another and a cover 710 that is attachable to the housing. The plurality of individual compartments includes a base compartment 720 and at least one furcation tray 730 configured to provide a plug-and-play connection to remote radio unit(s) served by the break out device by jumper cables having ruggedized connectors (not shown). In the exemplary break out device shown in FIGS. 15A-15D, break out device 700 is configured to serve three remote radio units, each remote radio unit having a dedicated furcation tray 730. Thus, break out device 700 is shown as having three individual compartments (one base compartment providing two connection interfaces 740, 750 in addition to anchoring to the trunk cable 20 and two furcation trays providing additional connection interfaces). Inclusion of the connection interfaces into the base compartment enables a more compact overall design. The modular design of breakout device 700 enables capacity customization (i.e. the ability to service additional remote radio units) by simply adding additional furcation trays to the housing. Any additional trays can be added to the stacked housing between the base compartment 720 and the cover 710.

Figure 16:
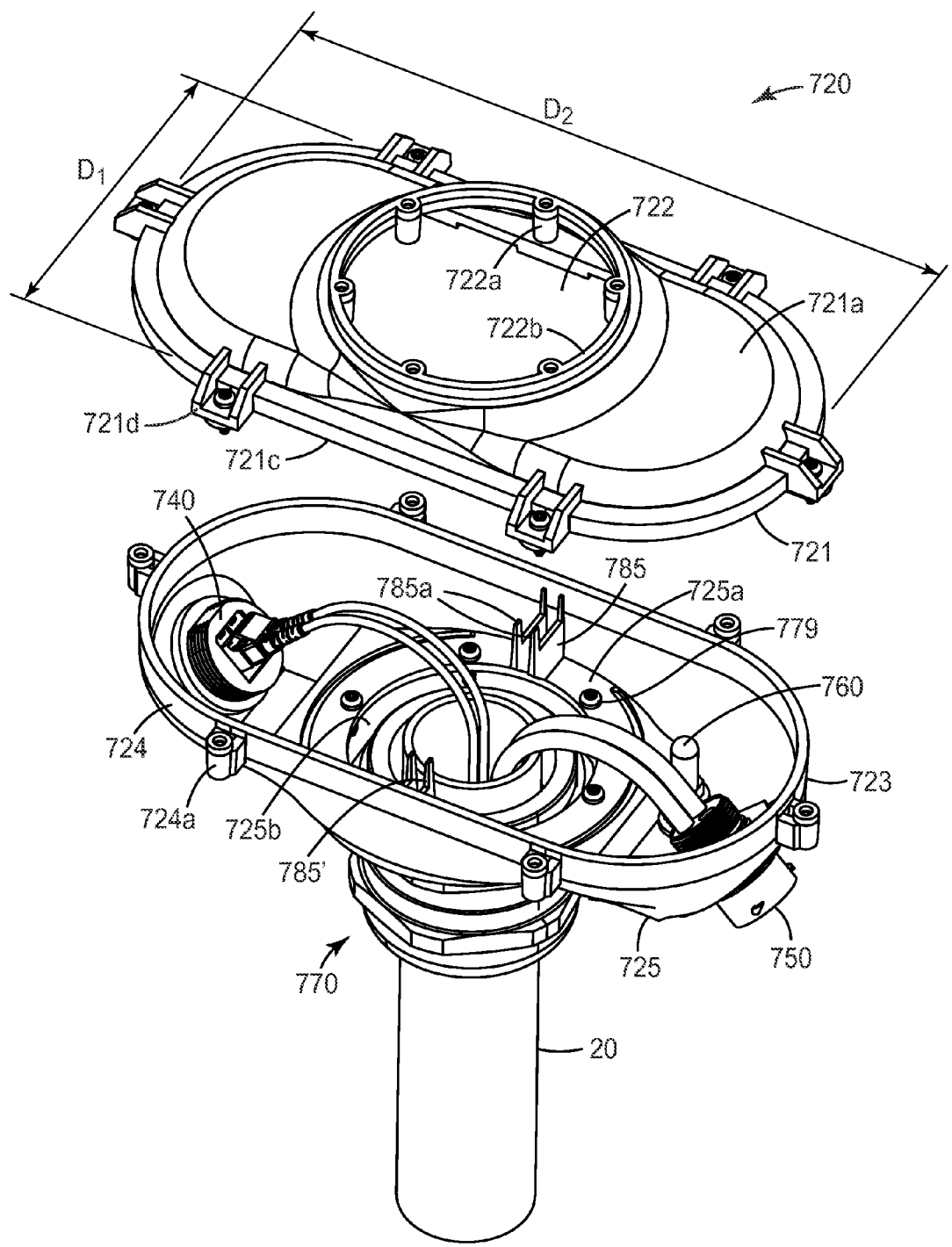
FIG. 16 is an isometric view of a base compartment of the exemplary breakout device of FIGS. 15A-15D.
Figure 17:
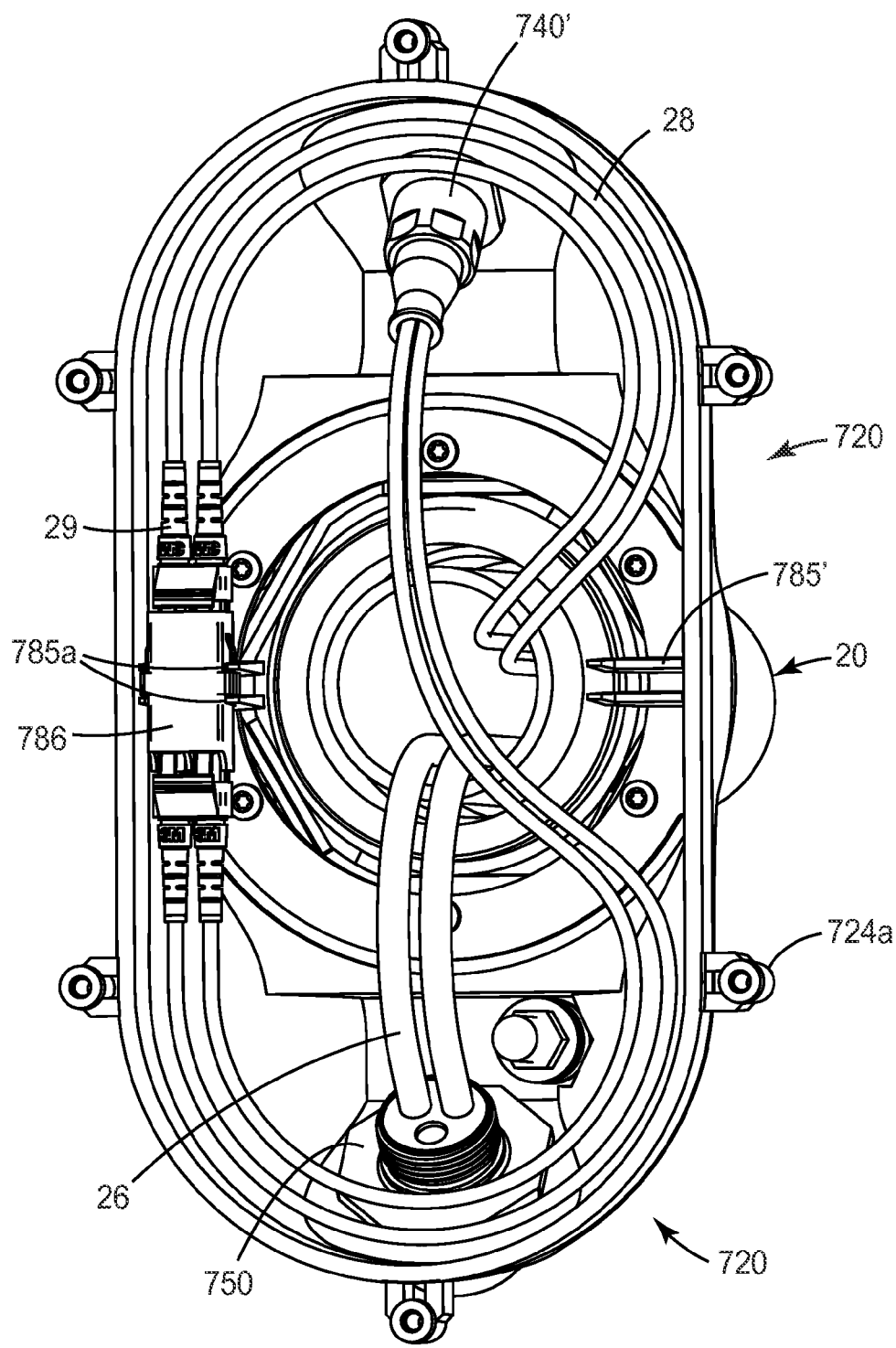
FIG. 17 is an isometric view of a furcation tray of the exemplary breakout device of FIGS. 15A-15D.

Base compartment 720 is shown in additional detail in FIGS. 16 and 17. Base compartment 720 includes an upper housing portion 721 and a lower housing portion 723, wherein the upper housing portion can be secured to the lower housing portion to enclose an interior space. In an exemplary aspect, the upper portion can have a generally rectangular, elliptical or race track shape that is characterized by a first diameter, $D_1$, and a second diameter, $D_2$ wherein $D_2$ is greater than $D_1$, i.e. the upper housing portion is longer than it is wide. For example, the ratio of $D_1$:$D_2$ can be 2:3. In one aspect, at least a portion of the long sides of the upper housing portion can be straight to provide an oval race track shape. Alternatively, the upper housing portion, and hence the base compartment, can have another shape, such as a rectangular, triangular, or other polygonal shape as dictated by design choice.

The upper housing portion 721 can be generally solid having a central conductor passage 722 near the middle of the upper housing portion to allow the optical and electrical conductors to pass from the base compartment to a first furcation tray stacked on top of the base compartment. A plurality of fastener receptacles 722a can be positioned around the inner circumference of the central conductor passage to enable the attachment of the first furcation tray stacked to the base compartment via a plurality of mechanical fasteners, such as screws or pins. In addition, the first furcation tray stacked on top of the base compartment can have a raised rib 722b extending from the top surface 721a of the upper housing portion around the circumference of the central conductor passage to aid in the proper positioning of the first furcation tray stacked on the base compartment and to provide a positioning surface for an inter-compartment sealing member 790, such as an o-ring or preformed gasket, disposed between the first furcation tray stacked and the base compartment when the first furcation tray is secured on top of the base compartment. The inter-compartment sealing member is configured to provide an environmental seal when two compartments of the exemplary break-out device are secured to one another such as when a first furcation tray 730 is attached to the base compartment 720 or when two furcation trays are attached to one another.

The upper housing portion 721 can further include a plurality of connection tabs 721d extending from the outer circumferential edge 721c of the upper housing portion, wherein the connection tabs are configured to receive mechanical fasteners to secure the upper housing portion to the lower housing portion 723 of the base compartment 720.

Figure 19:
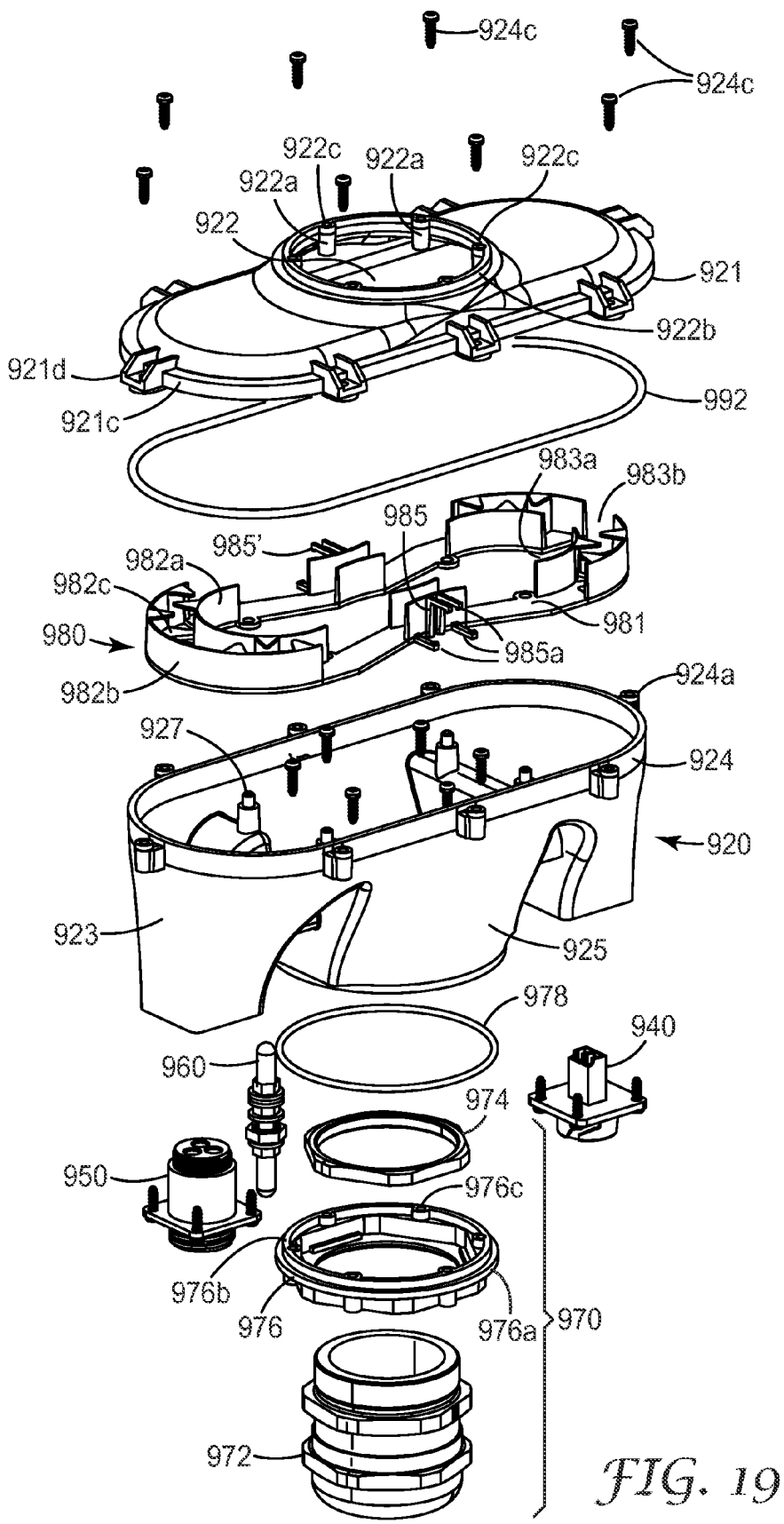
FIG. 19 is an isometric view of a base compartment of the exemplary breakout device of FIGS. 18A-18C.

In an exemplary aspect, the upper housing portion 721 can have a channel (not shown) disposed in the bottom surface of the upper housing portion adjacent to the outer circumferential edge 721c of the upper housing portion to receive an intra-housing sealing member, similar to intra-housing sealing member 992, as shown in FIG. 19. The intra-housing sealing member is configured to provide an environmental seal when the upper housing portion is secured to the lower portion housing of the base compartment.

The lower housing portion 723 can be generally dish shaped having a vertical rim 724 along a top edge of an elongated bowl shaped portion 725. A plurality of receiving bosses 724a can be positioned around the outer circumference of vertical rim 724 to enable the attachment of the upper housing portion to the lower housing portion via a plurality of mechanical fasteners, such as screws or pins. Because the receiving bosses are located along the outside surface of the vertical rim and not into the interior of the base compartment no auxiliary sealing is required around the mechanical fasteners to ensure the environmental seal of the compartment.

An opening 725b for cable port 770 can be disposed at the bottom of the elongated bowl shaped portion to enable passage of a trunk cable 20 or a conduit carrying a plurality of optical and/or electrical conductors into the base compartment 720 of break-out device 700. An anchor ring 725a can be formed around opening 725b to provide a connection interface for attaching the cable port to the break-out device. For example, the anchor ring can include a plurality of holes configured to accept mechanical fasteners, e.g. screws, to couple the cable port to the base compartment. In an exemplary aspect, opening 725b can be a circular opening, although the opening could have another polygonal shape.

Figure 15A:
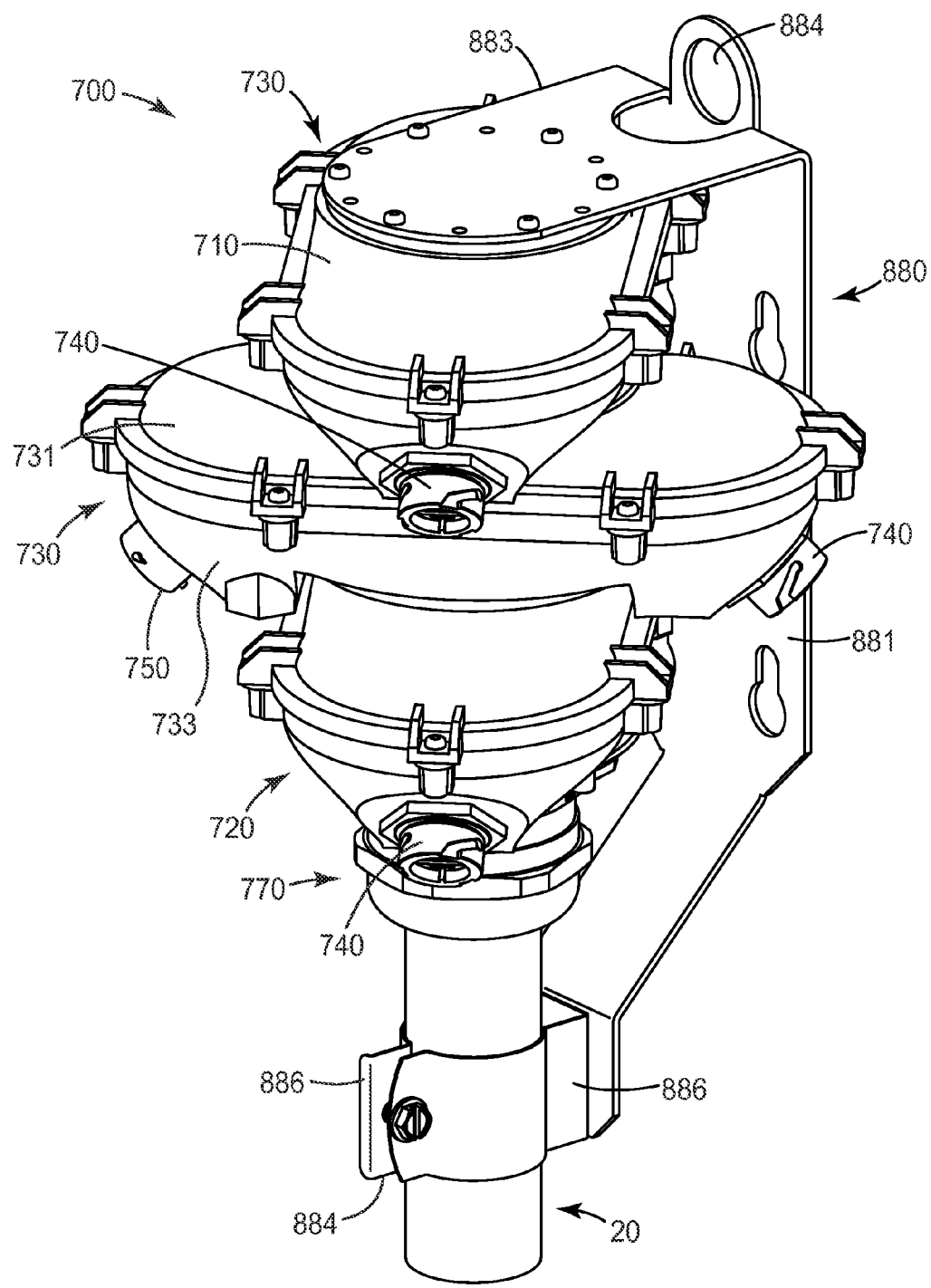
FIGS. 15A-15D are four views of another exemplary breakout device according to an aspect of the invention.
Figure 15B:
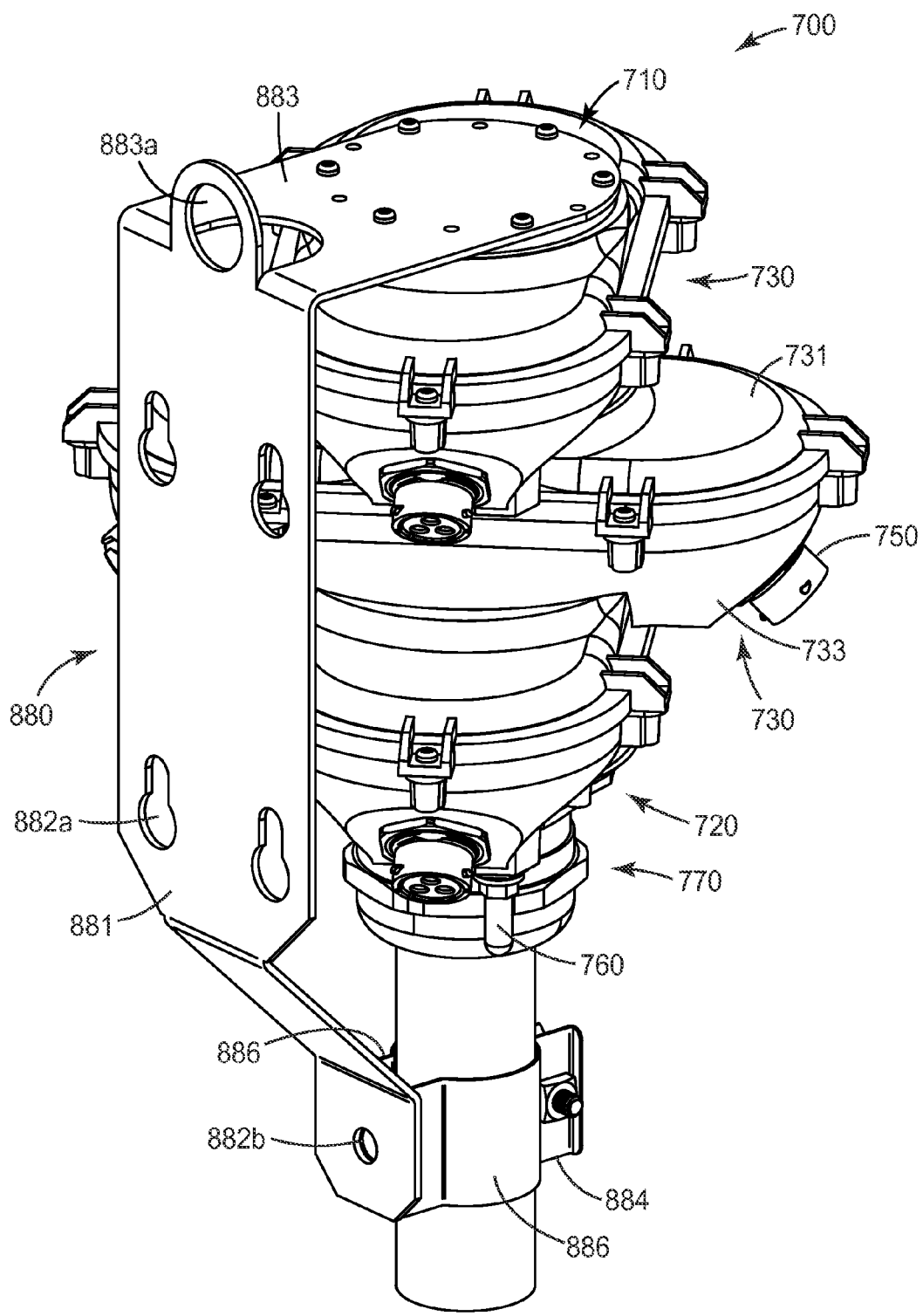
Figure 15C:
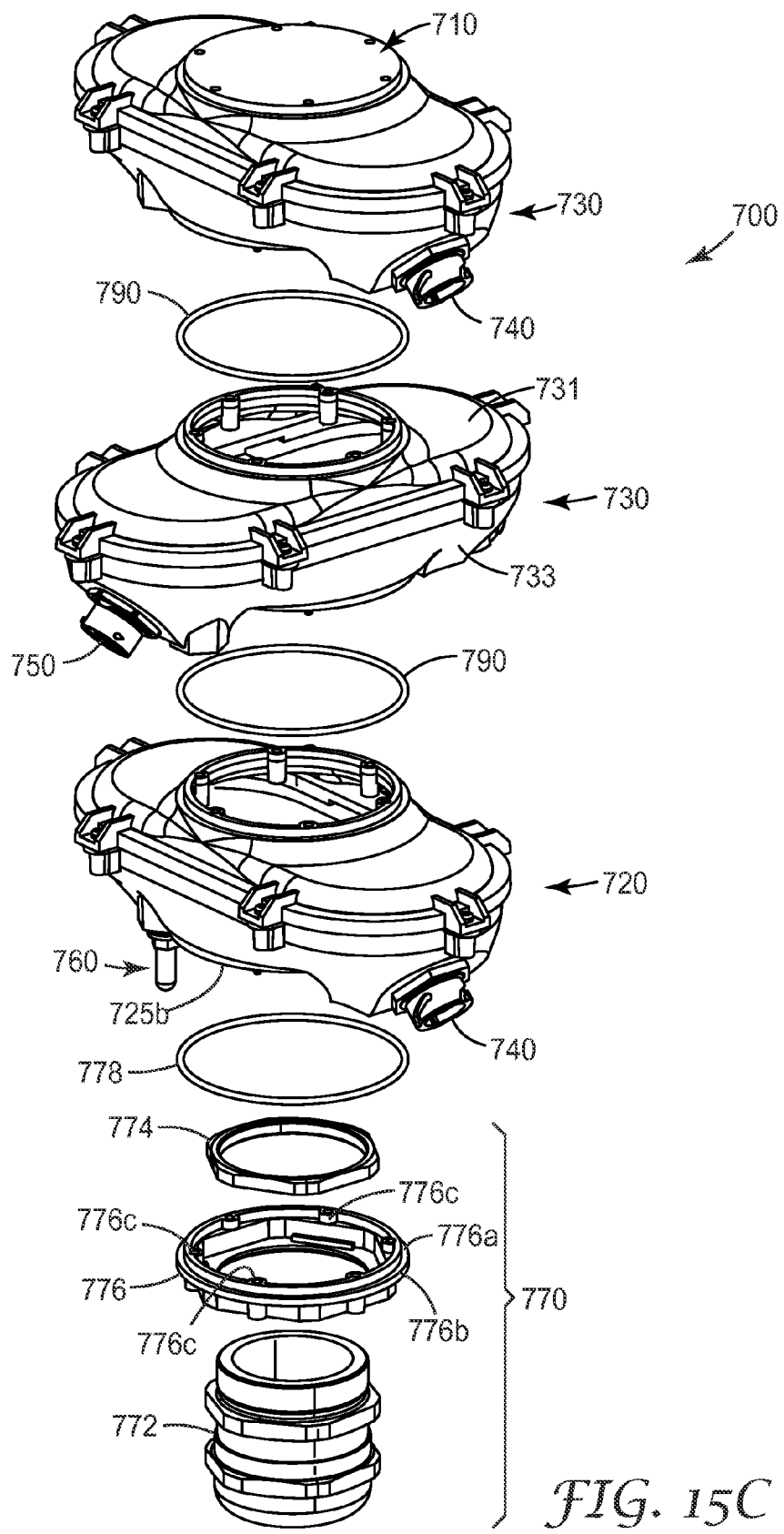

Referring to FIGS. 15C and 16, cable port 770 can include a cable gland 772, an adapter ring 776 which can be secured to the base compartment and a capture nut 774 to secure the cable gland to the capture ring. The adapter ring can be a generally circular annular structure comprising a central flange 776a having an outer circumferential edge and an inner circumferential edge, a lip 776b extending from the inner circumferential edge that is configured to be inserted into opening 725b in the lower housing portion of base compartment 720. A sealing member 778 can be place around the lip of the adapter ring such that it rests on an upper surface of the central flange between the lip and the outer circumferential edge of the central flange. The adapter ring can be inserted into the opening 725b in the lower housing portion of base compartment 720 until the central flange abuts against the external surface of the lower housing portion, capturing sealing member 778 between the adapter ring and the lower housing portion of the base compartment. Mechanical fasteners 779 can be placed through the holes in the anchor ring 725c and into connection receptacles 776c disposed around the inner circumference of the adapter ring and tightened to secure the adapter ring the lower housing portion of the base compartment. Cable gland 772 can be partially inserted into the adapter ring and capture nut 774 can be applied to the portion of the cable gland that has passed through the adapter ring to secure the cable gland to the lower housing portion of the base compartment. An exemplary cable gland can be obtained from Lapp USE, Inc. (Florham Park, N.J., P/N 53015290).

Base compartment 720 can further include an opening (not shown) extending through the bottom wall 721 to accept a ground stud 760. The shielding layer of the trunk cable, if present, can be connected to the ground stud by bridging element (not shown) inside the interior of the base compartment. A ground wire (not shown) can connect the ground stud to the cell tower superstructure outside of breakout device 700 so that the trunk cable's shielding layer is connected to earth ground.

Base compartment 720 can further include a sloped wall portion disposed on opposite side of the lower housing portions. In an exemplary aspect, a connection interface 740, 750 can be disposed in and opening in each sloped wall portion. The connection interface can be an optical connection interface or an electrical connection interface. Inclusion of the connection interface(s) within the base compartment requires one fewer furcation trays than would be needed if using breakout device 100, 300, 500, 600, enabling a smaller, more compact device.

The connection interfaces can be mounted in a sloped wall portion such that the connection interfaces are disposed at an angle of about 30° to about 70° from an axis defined by the trunk cable, preferably at an angle of about 45° to about 60°. Angling the connection interfaces down as shown in FIGS. 15A-15C can be advantageous when the break-out device is disposed higher on the tower than the remote radio units to which it is being connected. Additionally, angling the connection interfaces provides a degree of protection to the connection between the optical electrical jumpers and the connection interfaces from falling objects. In addition, the body of the furcation trays and the base compartment provide an added degree of protection when the sloping wall portion is disposed on the lower housing portion of the compartment by helping to shield the connection interface from the falling objects.

Base compartment 720 can include a holder 785 configured to hold an optical fiber connector adapter, such as an LC connector adapter 786 (see FIG. 17), or a splice holder (not shown) configured to hold either mechanical or optical splices. The holder 785 includes a plurality of latch arms 785a that is configured to securely hold the LC connector adapter or the splice holder. Integrally forming holder 785 with the lower housing portion alleviates the need for an auxiliary tray or plate, such as LC adapter plate 580 shown in FIG. 9C which can allow a smaller lower housing or provide additional space for slack storage. In the exemplary base compartment shown in FIGS. 16 and 17, the lower housing portion included two holders 785, 785'. These fiber holders can be used to hold optical fiber connector adapters, optical fiber splice holders or a combination thereof. Additional or fewer holders could also be incorporated into the exemplary lower housing and is considered to fall within the scope of the current disclosure.

The optical connection interface 740 and the electrical connection interface 750 can be similar to those previously described. The connection interfaces allow the final connection between breakout device 700 and the remote radio unit to be made with pre-terminated jumper cables, in particular ruggedized pre-terminated jumper cables. In an exemplary aspect, the connection interfaces 740, 750 can be in the form of receptacles that are configured to accept a ruggedized optical fiber connector or a ruggedized electrical connector, respectively.

The furcation trays 730 have a structure similar to base compartment 720. Referring to FIGS. 15A-15D, each furcation tray includes an upper housing portion 731 and a lower housing portion 733, wherein the upper housing portion can be secured to the lower housing portion to enclose an interior space, except for the upper most furcation tray in the stack in which the upper housing portion is replaced by cover 710. In an exemplary aspect, the upper housing portion can have a generally rectangular, elliptical or race track shape that is characterized by a first diameter and a second diameter wherein the second diameter is greater than the first diameter.

The upper housing portion 731 of the furcation tray is structurally identical to the upper housing portion 721 of the base compartment 720.

Similarly, the lower housing portion 732 of the furcation tray 730 is substantially identical to the lower housing portion 722 of the base compartment except that there is no opening for a ground plug although there could be and that the anchor ring of the furcation tray is used to secure the tray to the connection receptacles of another furcation tray disposed beneath the anchor ring.

Each furcation tray will have an inter-compartment sealing member 790 disposed between it and any compartment (i.e. a base compartment or another furcation tray) to provide environmental protection between adjacent compartments.

Figure 15D:
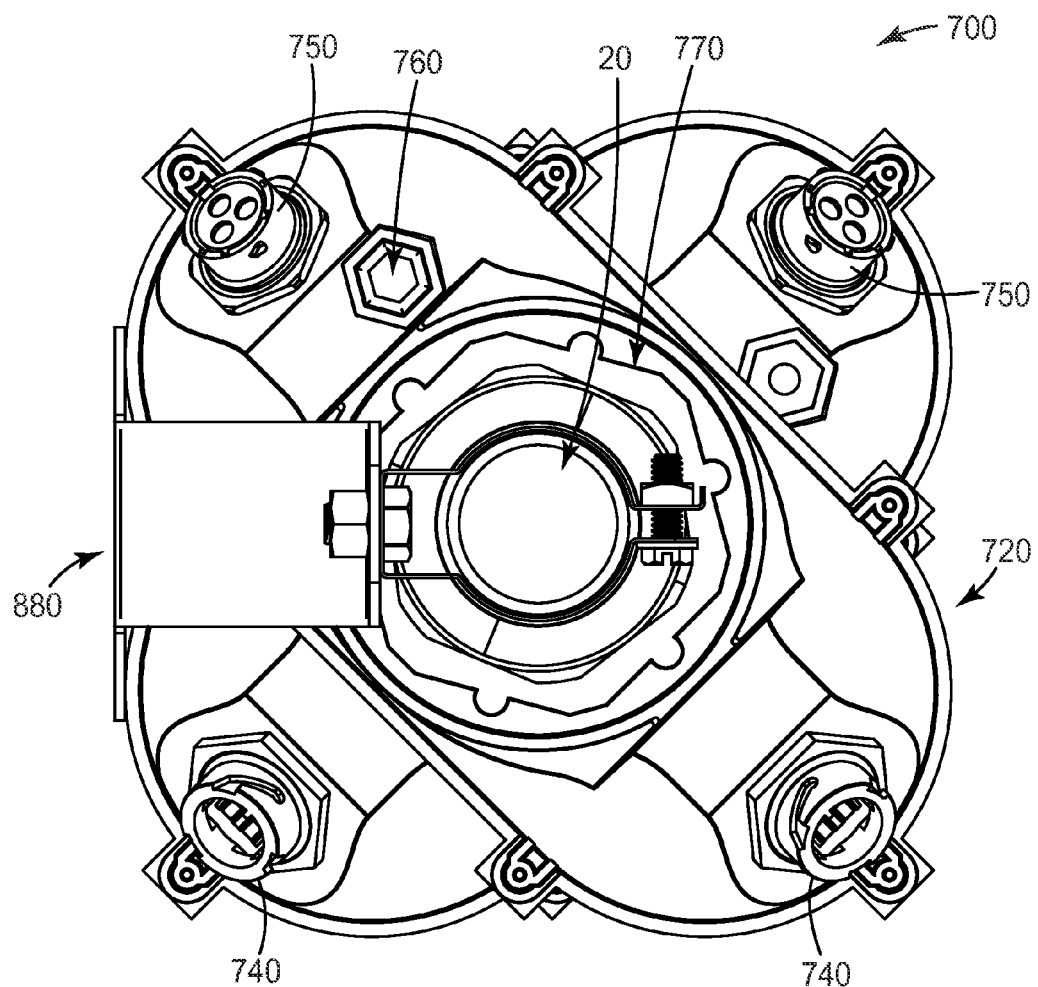

Each individual compartment in break out device 700 can be rotated around an axis defined by the trunk cable relative to a position of an adjacent compartment (the base case and/or another furcation tray). In an exemplary aspect, the individual compartments can be rotated at an angle of between 30° to about 150° relative to the position of the adjacent compartment. For example, FIG. 15D shows a bottom view of the exemplary break-out device showing the 90° angular offset between the base compartment 720 and the first furcation tray 730. This rotational shift between adjacent compartments provides clearance in the overall structure immediately below each receptacle for unfettered access for the mating cable. In addition, the exemplary break-out device can be configured so that all of the optical connections are principally on one side of the overall stack and the power connectors are on the other side.

Cover 710 is shaped to fit onto the top of the uppermost furcation tray in the stack and is very similar to upper housing portion 721, 731 except that there is no opening through the cover to allow passage of any cables or conductors. The cover has a substantially continuous surface that is configured to completely close the top furcation tray in the housing stack that is the exemplary breakout device of the present embodiment. Blind connection receptacles open at the top surface of the cover allow attachment of the cover to the header portion of the mounting bracket and since the blind connection receptacles do not extend through the cover no auxiliary sealing is required around the mechanical fasteners.

Mounting bracket 880 is configure to secure break-out device onto a cell tower or other mounting structure such as a wall or roof top support structure and is shown in FIGS. 15A and 15B. Mounting bracket 880 includes a mounting portion 881 and a cable clamping portion 884. The mounting portion can be generally L-shaped having long body portion and a short attachment arm 883 extending therefrom. Mechanical fasteners can be placed through a plurality of openings in the attachment arm into the blind connection receptacles in the cover 710 of breakout device 700. The mounting portion can include an opening 883*a* that can accommodate a hook (not shown) attached to a cable from a crane that is used to lift the breakout device to its mounting location up on the cell tower.

The long body portion of mounting portion 881 can include a plurality of mounting holes 882*a* that are used to attach the mounting bracket to the cell tower via bolts or other mechanical means such as screws, rivets, pegs or hooks. In addition, the long body portion of mounting portion 881 includes cable clamp attachment features such as holes 882*b* disposed on the end of the long body portion opposite the attachment arm 883.

The cable clamping portion 884 clamps the trunk cable 20 between two cable holders 886. The cable clamping portion is attached to the mounting portion of bracket 880 via mechanical fasteners (i.e. a bolt and corresponding nut) inserted through hole 882*b* disposed on the end of the long body portion.

Figure 18A:
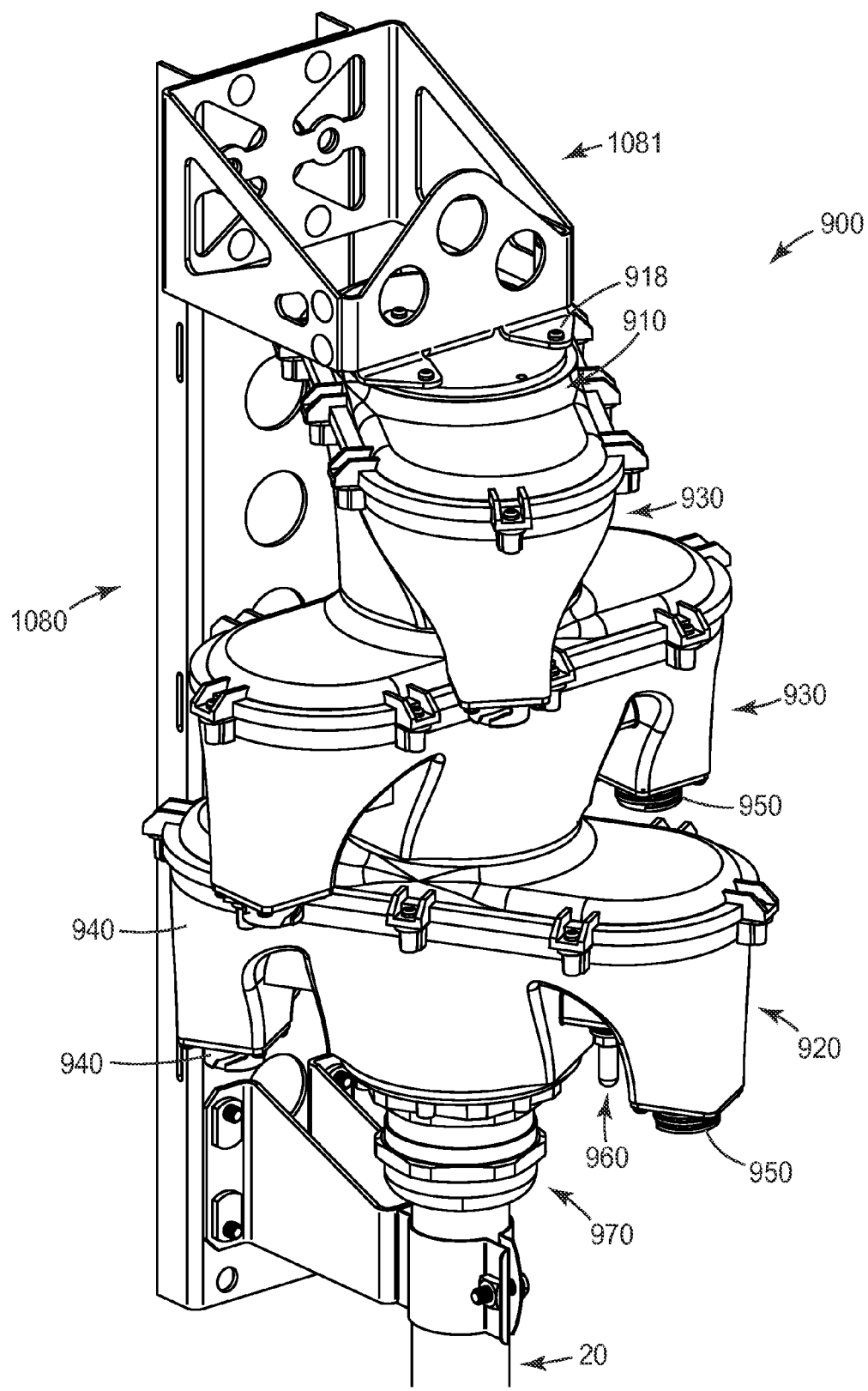
FIGS. 18A-18C are three views of yet another exemplary breakout device according to an aspect of the invention.
Figure 18B:
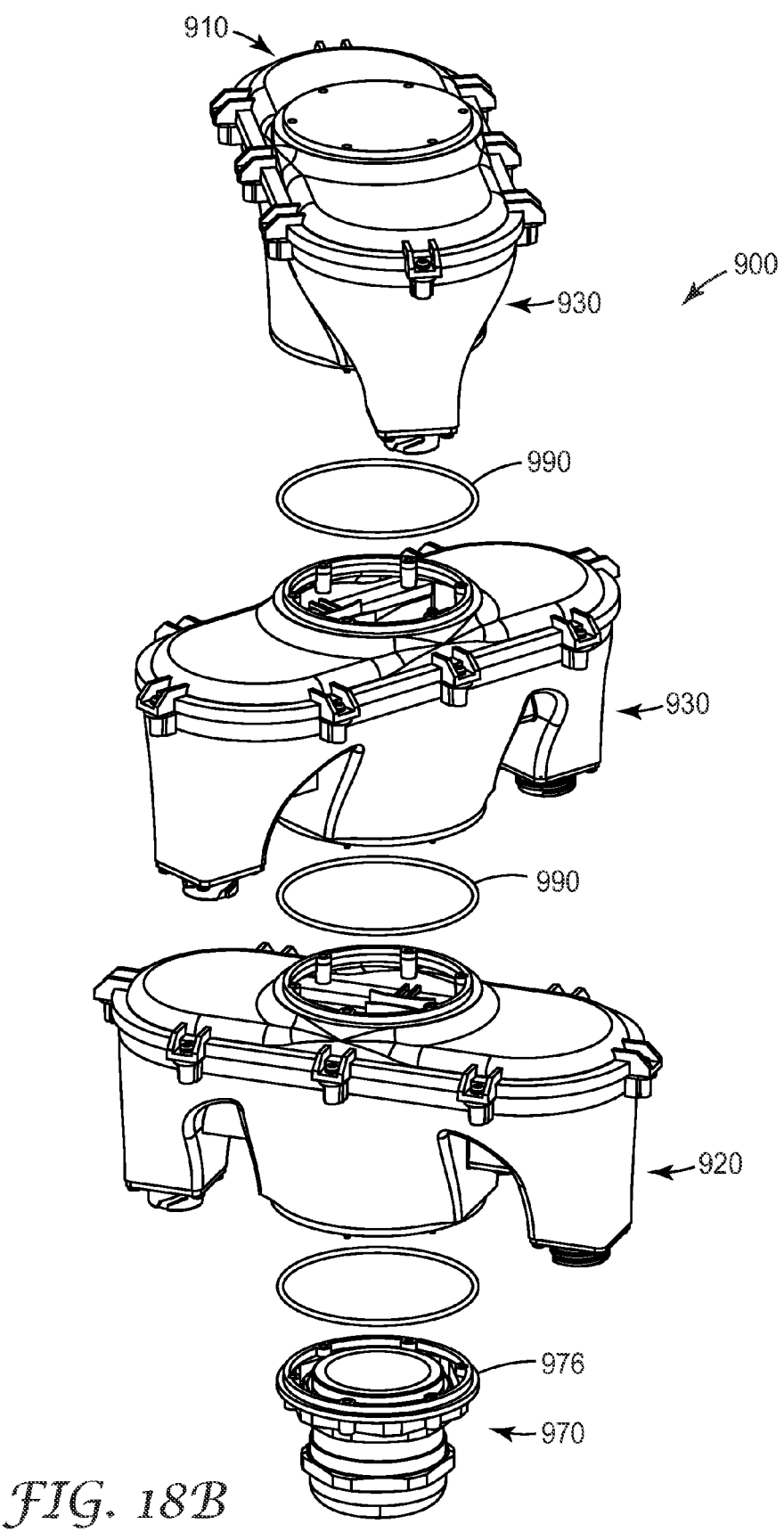
Figure 18C:
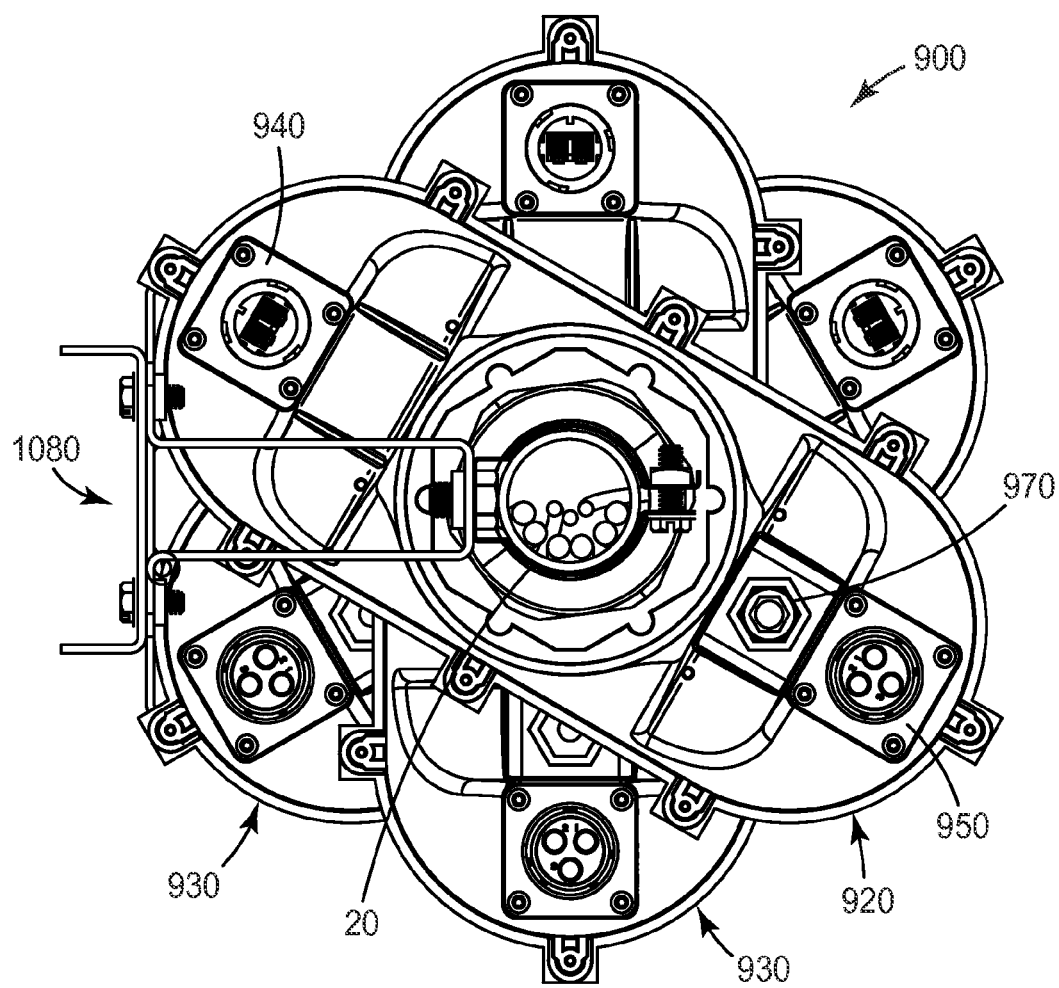

Yet another exemplary breakout device 900 is shown in FIGS. 18A-18C. Break out device 900 is substantially similar to break out device 700 shown in FIGS. 15A-15D. The main difference is the position of the connection interfaces 940, 950 which are disposed at the bottom of compartments 920 and 930. In particular, break out device 900 has a housing made up of a plurality of individual compartments 920, 930 stacked one upon another and a cover 910 that is attachable to the housing. The plurality of individual compartments includes a base compartment 920 and at least one furcation tray 930 configured to provide a plug-and-play connection to remote radio unit(s) served by the break out device by jumper cables having ruggedized connectors (not shown). In the exemplary break out device shown in FIGS. 18A-18C, break out device 900 is configured to serve three remote radio units, each remote radio unit having a dedicated furcation tray 930. Thus, break out device 900 is shown as having three individual compartments (one base compartment providing two connection interfaces 940, 950 in addition to anchoring to the trunk cable 20 and two furcation trays providing additional connection interfaces). Inclusion of the connection interfaces into the base compartment enables a more compact overall design as described previously.

Positioning of the connection interfaces are such that they are disposed parallel to the incoming trunk cable on the bottom side of each compartment provides the interface connections with a high degree of protection from falling objects. In addition, the position of the interface connections helps to eliminate bending stresses due to gravity on the jumper cables where they attach to the break out device. The modular design of breakout device 900 enables capacity customization (i.e. the ability to service additional remote radio units) by simply adding additional furcation trays to the housing. Any additional trays can be added to the stacked housing between the base compartment 920 and the cover 910.

Base compartment 920 is shown in additional detail in FIG. 19. Base compartment 920 includes an upper housing portion 921 and a lower housing portion 923, wherein the upper housing portion can be secured to the lower housing portion to enclose an interior space. In an exemplary aspect, the upper portion can have a generally rectangular, elliptical or race track shape that is characterized by a first diameter, D1, and a second diameter, D2 wherein D2 is greater than D1, i.e. the upper housing portion is longer than it is wide. For example, the ratio of D1:D2 can be 1:2. In one aspect, at least a portion of the long sides of the upper housing portion can be straight to provide an oval race track shape.

The upper housing portion 921 can be generally solid having a central conductor passage 922 near the middle of the upper housing portion to allow the optical and electrical conductors to pass from the base compartment to a first furcation tray stacked on top of the base compartment. A plurality of fastener receptacles 922*a* can be positioned around the inner circumference of the central conductor passage to enable the attachment of the first furcation tray stacked to the base compartment via a plurality of mechanical fasteners 922*c*, such as screws or pins. In addition, the first furcation tray stacked on top of the base compartment can have a raised rib 922*b* extending from the top surface 921*a* of the upper housing portion around the circumference of the central conductor passage to aid in the proper positioning of the first furcation tray stacked on the base compartment and to provide a positioning surface for an inter-compartment sealing member 990, such as an o-ring or preformed gasket, disposed between the first furcation tray stacked and the base compartment when the first furcation tray is secured on top of the base compartment. The inter-compartment sealing member is configured to provide an environmental seal when two compartments of the exemplary break-out device are secured to one another such as when a first furcation tray 920 is attached to the base compartment 920 or when two furcation trays are attached to one another.

The upper housing portion 921 can further include a plurality of connection tabs 921*d* extending from the outer circumferential edge 921*c* of the upper housing portion, wherein the connection tabs are configured to receive mechanical fasteners to secure the upper housing portion to the lower housing portion 923 of the base compartment 920.

In an exemplary aspect, the upper housing portion 921 can have a channel (not shown) disposed in the bottom surface of the upper housing portion adjacent to the outer circumferential edge 921*c* of the upper housing portion to receive an intra-housing sealing member 992. The intra-housing sealing member is configured to provide an environmental seal when the upper housing portion is secured to the lower portion housing of the base compartment.

The lower housing portion 923 can have a generally hollow M-shape having a vertical rim 924 along a top edge of an M-shaped portion 925. A plurality of receiving bosses 924*a* can be positioned around the outer circumference of vertical rim 924 to enable the attachment of the upper housing portion to the lower housing portion via a plurality of mechanical fasteners 924*c*, such as screws or pins. Because the receiving bosses are located along the outside surface of the vertical rim and not into the interior of the base compartment no auxiliary sealing is required around the mechanical fasteners to ensure the environmental seal of the compartment.

An opening (not shown) through a lower surface the central body of the M-shaped portion accommodates cable port 970 enabling passage of a trunk cable 20 or a conduit carrying a plurality of optical and/or electrical conductors into the base compartment 920 of break-out device 900.

Referring to FIGS. 18B and 19, cable port 970 can include a cable gland 972, an adapter ring 976 which can be secured to the base compartment by mechanical fasteners as described previously with respect to cable port 770 (FIG. 16) and a capture nut 974 to secure the cable gland to the capture ring. The adapter ring can be a generally circular annular structure comprising a central flange 976*a* having an outer circumferential edge and an inner circumferential edge, a lip 976b extending from the inner circumferential edge that is configured to be inserted into opening 925b in the lower housing portion of base compartment 920. A sealing member 978 can be placed around the lip of the adapter ring such that it rests on an upper surface of the central flange between the lip and the outer circumferential edge of the central flange. The adapter ring can be inserted into the opening capturing sealing member 978 between the adapter ring and the lower housing portion of the base compartment and can be secured in place with mechanical fasteners inserted into connection receptacles 976c disposed around the inner circumference of the adapter to secure the adapter ring the lower housing portion of the base compartment. Cable gland 972 can be partially inserted into the adapter ring and capture nut 974 can be applied to the end of the cable gland that has passed through the adapter ring to secure the cable gland to the lower housing portion of the base compartment.

Base compartment 920 can further include a ground stud 960 that can be attached to a shield layer (if present) in the trunk cable and a ground wire (not shown) can be used to connect the ground stud to the cell tower superstructure outside of breakout device 900 so that the trunk cable's shielding layer is connected to earth ground.

The lower housing portion 923 of the base compartment 920 can include a connection interface (e.g. an electrical connection interface 950 and/or an optical connection interface 940) extending through the bottom surface of the left and or right side portions of the lower housing portion 923. In an exemplary aspect, a connection interface 940, 950 can be disposed in and opening in the bottom surface of the left and or right side portions. In this exemplary aspect, the connection interfaces in the base compartment are oriented parallel to trunk cable such that the jumper cables are attached to break out device 900 in a vertical orientation. Inclusion of the connection interface(s) within the base compartment requires one fewer furcation trays than would be needed if using breakout device 100, 300, 500, 600 enabling a smaller more compact device.

Base compartment 920 can further include an adapter plate 980 that is configured to rest on top of the mounting pegs 927 disposed in the lower housing portion to create a cable management and optical connection platform. In the exemplary embodiment shown in FIG. 19, adapter plate 980 can be generally FIG. 8 shape. The adapter plate includes a base plate 981 having inner and outer guide walls 982a, 982b extending from the base plate to form an optical fiber slack storage channel 982c. The inner and outer guide walls can be continuous or can have gaps disposed between adjacent wall segments to allow passage of the optical fibers into the fiber slack storage channel. The gaps define cable entries 983a, 983b where the optical fibers can enter and exit the fiber slack storage channel of the adapter plate. A holder 985 can be disposed on the outer guide wall in the waisted region of the adapter plate to hold an optical fiber connector adapter, such as an LC connector adapter 986 shown in FIG. 20B, or a splice holder (not shown) configured to hold either mechanical or optical splices. The holder 985 includes a plurality of latch arms 985a that are configured to securely hold the optical fiber connector adapter or the splice holder. In the exemplary base compartment shown in FIGS. 19 and 20A-20B, the adapter plate includes two holders 985, 985'. These fiber holders can be used to hold optical fiber connector adapters, optical fiber splice holders or a combination thereof.

The optical connection interface 940 and the electrical connection interface 950 can be similar to those previously described. The connection interfaces allow the final connection between breakout device 900 and the remote radio unit to be made with pre-terminated jumper cables, in particular ruggedized pre-terminated jumper cables. In an exemplary aspect, the connection interfaces 940, 950 can be in the form of receptacles that are configured to accept a ruggedized optical fiber connector or a ruggedized electrical connector, respectively.

Figure 20A:
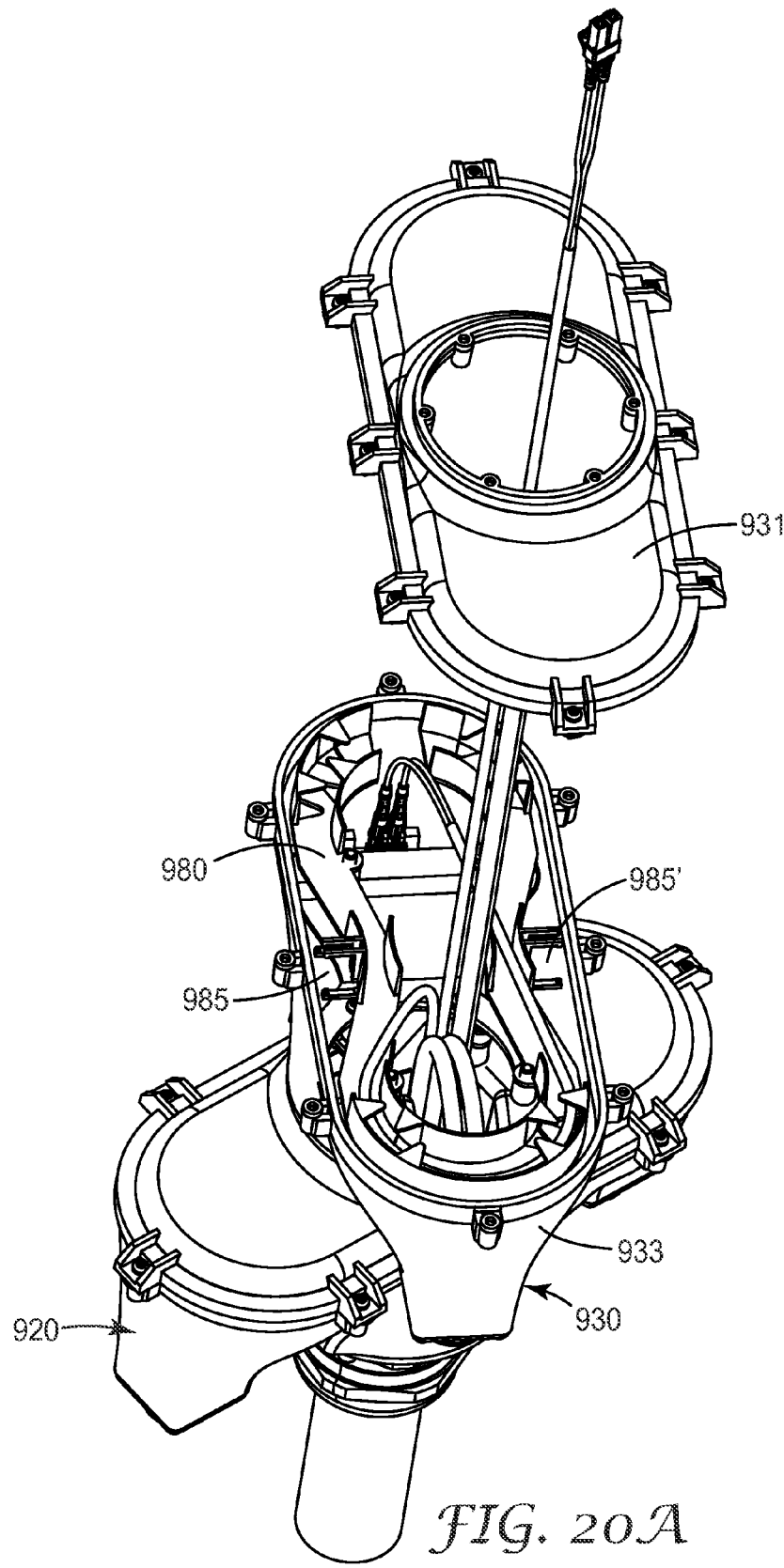
FIGS. 20A-20B are two isometric views of a furcation tray of the exemplary breakout device of FIGS. 18A-18C.
Figure 20B:
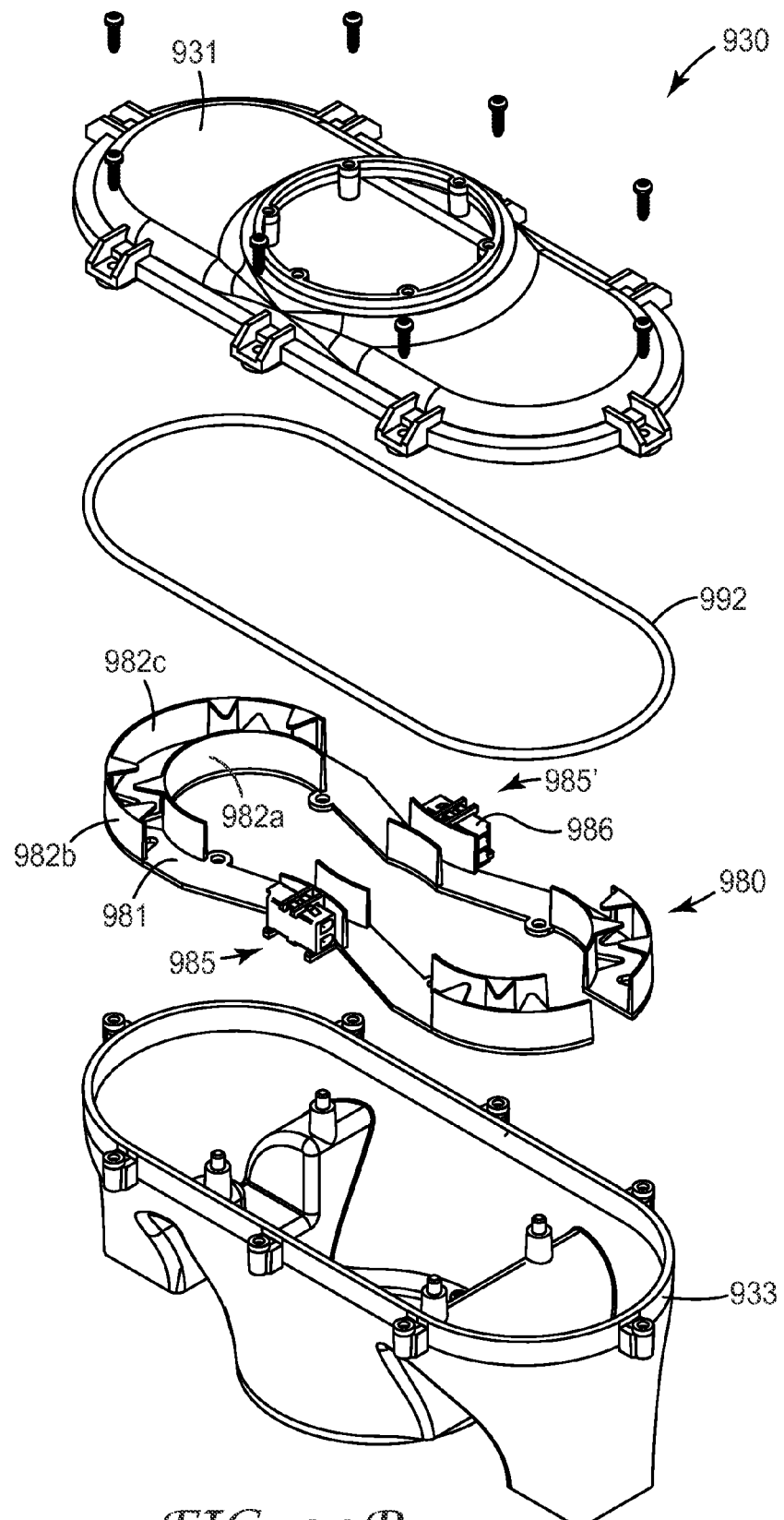

The furcation trays 930 have a structure similar to base compartment 920. Referring to FIGS. 20A-20B, each furcation tray includes an upper housing portion 931 and a lower housing portion 933, wherein the upper housing portion can be secured to the lower housing portion to enclose an interior space, except for the upper most furcation tray in the stack in which the upper housing portion is replaced by cover 910 (see FIG. 18A-B). In an exemplary aspect, the upper housing portion can have a generally rectangular, elliptical or race track shape that is characterized by a first diameter and a second diameter wherein the second diameter is greater than the first diameter.

The upper housing portion 931 of the furcation tray is structurally identical to the upper housing portion 921 of the base compartment 920.

Similarly, the lower housing portion 933 of the furcation tray 930 is substantially identical to the lower housing portion 922 of the base compartment 920 except that there is no opening for a ground plug although there could be and that the anchor ring of the furcation tray is used to secure the furcation tray to the connection receptacles of another furcation tray or the base compartment disposed beneath the anchor ring rather than being used for the cable port.

Each furcation tray will have an inter-compartment sealing member 990 (FIG. 18B) disposed between it and any other compartment (i.e. a base compartment or another furcation tray) disposed above or below it to provide environmental protection between adjacent compartments.

As previously mentioned, each individual compartment in break out device 900 can be rotated at an angle of between 30° to about 150° around an axis defined by the trunk cable relative to a position of an adjacent compartment (the base case and/or another furcation tray). For example, the furcation trays can be oriented at 60° offset or angle relative to the compartment or tray disposed above or below it (i.e. the furcation tray can be rotated around the axis that is collinear or parallel to the trunk cable). FIG. 18C shows a bottom view of the exemplary break-out device 900 showing the 60° offset between the base compartment 920 and the first furcation tray 930. This rotational shift between adjacent compartments provides clearance in the overall structure immediately below each receptacle for unfettered access for the mating cable. In general, the angular offset between adjacent trays can be decreased providing that the ratio of D1:D2 is increased so as to provide adequate clearance for attachment of jumper cables to the exemplary break out device. In addition, the exemplary break-out device can be configured so that all of the optical connections are principally on one side of the overall stack and the power connectors are on the other side.

Cover 910 is shaped to fit onto the top of the uppermost furcation tray in the stack and is very similar to upper housing portion 921, 931 except that there is no opening through the cover. Blind connection receptacles open at the top surface of the cover allow attachment of the cover to the header portion of the mounting bracket and since the blind connection receptacles do not extend through the cover no auxiliary sealing is required around the mechanical fasteners.

Breakout device 900 can be attached to a support structure via a mounting bracket 1080 that is similar to mounting bracket 680 shown in FIG. 14 except that the design header portion 1081 has been modified to attach to cover 910 via a plurality of mechanical fasteners as shown in FIG. 18A.

Various modifications including extending the use of the breakout device to other applications with copper telecommunication cables or copper coax cables, providing more than one cable entry port in the base compartment, varying the number and mix of connection interfaces in each furcation box as dictated by the particular network architecture as well as numerous structures to which the present invention may be applicable will be readily apparent to those of skill in the art to which the present invention is directed upon review of the present specification.

I claim:

1. A modular breakout device providing optical and electrical connection interfaces, the device comprising:
   a sealed housing having a plurality of individual compartments stacked upon each other and a cover that is attachable to the housing,
   wherein the plurality of individual compartments comprises
      a base compartment including a port though a bottom wall of the base compartment that is configured to accept optical and electrical transmission media; and
      a first furcation tray having an optical connection interface and an electrical connection interface disposed in a side wall of the first furcation tray, and a channel formed in the bottom wall of the first furcation tray opposite the position where the side wall extends from the bottom wall, wherein the first furcation tray is disposed on top of the base compartment and the cover is disposed on top of the first furcation tray to enclose the housing; and
      a gasket disposed in the channel to provide an environmental seal between the base compartment and the first furcation tray.

2. The device of claim 1, wherein the housing comprises a plurality of furcation trays, each of the plurality of furcation trays has an optical connection interface and an electrical connection interface disposed in a side wall thereof, and wherein each of the plurality of furcation trays can be stacked one upon another between the base compartment and the cover.

3. The device of claim 1, wherein the base compartment further comprises a grounding stud.

4. The device of claim 1, wherein each furcation tray includes a cable ramp to manage the minimum bend radius of the cable entering the furcation tray.

5. The device of claim 1, further comprising an LC adapter base plate in the first furcation box.

6. The device of claim 1, wherein the optical connection interface and the electrical connection interface are disposed orthogonal to the side wall of the first furcation tray.

7. The device of claim 1, wherein the optical connection interface and the electrical connection interface are angled with respect to the side wall of furcation tray.

8. The device of claim 1, wherein the base compartment comprises at least one additional connection interface.

9. The device of claim 1, wherein each of the individual compartments is aligned with an adjacent compartment.

10. The device of claim 1, wherein each of the individual compartments is rotated around an axis defined by the trunk cable relative to a position of an adjacent compartment.

11. The device of claim 10, wherein each of the individual compartments is rotated at an angle of between 30° to about 150° relative to the position of the adjacent compartment.

12. A modular breakout device providing connection interfaces, the device comprising:
   a housing having a plurality of individual compartments stacked upon each other and a cover that is attachable to the housing,
   wherein the plurality of individual compartments comprises
      a base compartment including a port though a bottom wall of the base compartment that is configured to accept a conductor cable; and
      a first furcation tray having a first pair of conductor connection interfaces, and a channel formed in the bottom wall of the first furcation tray opposite the position where the side wall extends from the bottom wall, wherein the first furcation tray is disposed on top of the base compartment and the cover is disposed on top of the first furcation tray to enclose the housing; and
      a gasket disposed in the channel to provide an environmental seal between the base compartment and the first furcation tray.

13. The device of claim 12, further comprising a second furcation tray having a second pair of conductor connection interfaces disposed in a sidewall of the second furcation tray, wherein the second furcation tray is disposed between the first furcation tray and the cover.

14. The device of claim 12, wherein the connection interfaces are disposed orthogonal to the side wall of the first furcation tray.

15. The device of claim 12, wherein the connection interfaces are angled with respect to the side wall of the first furcation tray.

16. The device of claim 12, wherein the connection interfaces are disposed parallel to the conductor cable entering the base compartment.

17. The device of claim 12, wherein the base compartment comprises at least one additional connection interface.

18. The device of claim 12 wherein each of the individual compartments is aligned with an adjacent compartment.

19. The device of claim 12 wherein each of the individual compartments is rotated around an axis defined by the trunk cable relative to a position of an adjacent compartment.

20. The device of claim 19, wherein each of the individual compartments is rotated at an angle of between 30° to about 150° relative to the position of the adjacent compartment.

* * * * *